US012809330B2

(12) United States Patent
Chikwendu et al.

(10) Patent No.: US 12,809,330 B2
(45) Date of Patent: Nov. 24, 2026

(54) SYSTEM AND METHOD FOR GUIDING OPERATIONS ON A WORKPIECE

(71) Applicant: CUMULUS DIGITAL SYSTEMS, INC., Cambridge, MA (US)

(72) Inventors: Chizuruoke C. Chikwendu, Stoughton, MA (US); Joshua Napoli, Providence, RI (US); Shirshak Sharma, Somerville, MA (US); Derek Stewart, Brunswick, ME (US); Dylan Sumiskum, Boston, MA (US); Kaitlen A. Sousa, Boston, MA (US); Payal A. Zanwar, Cambridge, MA (US)

(73) Assignee: CUMULUS DIGITAL SYSTEMS, INC., Cambridge, MA (US)

( * ) Notice: Subject to any disclaimer, the term of this patent is extended or adjusted under 35 U.S.C. 154(b) by 630 days.

(21) Appl. No.: 17/896,857

(22) Filed: Aug. 26, 2022

(65) Prior Publication Data

US 2024/0069517 A1 Feb. 29, 2024

(51) Int. Cl.
*G05B 19/19* (2006.01)

(52) U.S. Cl.
CPC .... *G05B 19/19* (2013.01); *G05B 2219/35313* (2013.01); *G05B 2219/37458* (2013.01)

(58) Field of Classification Search
CPC .......... G05B 19/19; G05B 2219/35313; G05B 2219/37458; G05B 19/41875; G05B 19/4184
See application file for complete search history.

(56) References Cited

U.S. PATENT DOCUMENTS

| | | | | |
|---|---|---|---|---|
| 2014/0282257 | A1* | 9/2014 | Nixon | G05B 11/01 715/835 |
| 2019/0034855 | A1 | 1/2019 | Halioris et al. | |
| 2019/0176306 | A1 | 6/2019 | Sorensen et al. | |
| 2021/0149655 | A1* | 5/2021 | Mathews | G06F 8/60 |

OTHER PUBLICATIONS

International Search Report, in corresponding PCT/US23/31150, dated Nov. 16, 2023.

* cited by examiner

*Primary Examiner* — Mohammad Ali
*Assistant Examiner* — Sheela Rao
(74) *Attorney, Agent, or Firm* — Lando & Anastasi, LLP

(57) ABSTRACT

According to at least one aspect of the present disclosure a method of managing workflow for an industrial application is provided. The method comprises providing a guidance device configured to be communicatively coupled to a tool configured to be used on a workpiece, obtaining identification data pertaining to the workpiece being used in the industrial application, obtaining industrial application state data pertaining to at least one state of the industrial application, obtaining workpiece state data, operating the tool on the workpiece, obtaining tool operation data, uploading to a service, via the guidance device, at least one of the identification data, the industrial application state data, and the tool operation data, and validating the industrial application state data.

27 Claims, 12 Drawing Sheets

102
100

Data Source
104
102a
Tool
Guidance Device
102b
106
Smart-tool
Local Client
102c
Sensors
108
110
102d
Services
Manual Input
Top Level
User

1200

SYSTEM AND METHOD FOR GUIDING OPERATIONS ON A WORKPIECE

BACKGROUND

1. Field of the Disclosure

At least one example in accordance with the present disclosure relates generally to workflow management and control in industrial applications.

2. Discussion of Related Art

In large scale industrial applications, such as the construction of sophisticated chemical production and refining facilities, it is often necessary that each individual component of the facilities be properly installed to within predetermined tolerances so that the facility can operate efficiently and correctly. It may also be necessary to monitor each individual component in the facility to ensure it remains suitable for its intended purpose. Inadequate quality and engineering controls can lead to substantial losses and cost large sums to repair.

SUMMARY

According to at least one aspect of the present disclosure a method of managing workflow for an industrial application is provided. The method comprises providing a guidance device configured to be communicatively coupled to a tool configured to be used on a workpiece, obtaining identification data pertaining to the workpiece being used in the industrial application, obtaining industrial application state data pertaining to at least one state of the industrial application, obtaining workpiece state data, operating the tool on the workpiece, obtaining tool operation data, uploading to a service, via the guidance device, at least one of the identification data, the industrial application state data, and the tool operation data, and validating the industrial application state data.

In some examples, obtaining industrial application state data pertaining to at least one state of the industrial application includes obtaining a first industrial application state data pertaining to the state of the industrial application prior to operation of the tool, obtaining a second industrial application state data pertaining to the state of the industrial application after operation of the tool, and uploading at least one of the first and the second industrial application state data to the service. In various examples, the second industrial application state data is based at least in part on the tool operation data. In many examples, the method includes obtaining a first workpiece state data corresponding to the state of the workpiece prior to operation of the tool, obtaining a second workpiece state data corresponding to the state of the workpiece after operation of the tool, and uploading at least one of the first and the second workpiece state data to the service.

In some examples, the second workpiece state data is based at least in part on the tool operation data. In various examples, the industrial application state data is obtained by a set of requirements verified by an end user. In many examples, the tool operation data is obtained from a sensor configured to monitor the operation of the tool on the workpiece. In some examples, validating the industrial application state data includes flagging the workpiece for review responsive to determining that an error in the operation of the tool may have occurred, performing a quality check on the workpiece, and releasing the workpiece from review.

In some examples, the service analyzes the data it receives and provides analytic information to a user, the analytic information including a data model for the workpiece based on at least the industrial application state data. In various examples, validating the industrial application state data includes reviewing the analytic information. In many examples, uploading to a service via the guidance device further comprises transmitting the industrial application state data from a client installed on the guidance device to a local client communicatively coupled to the client, transmitting the industrial application state data from the local client to a server communicatively coupled to the local client, the server hosting a database configured to store the industrial application state data, and transmitting the industrial application state data from the server to the service, the service being configured to perform operations on the industrial application state data.

In some examples, the operations the service is configured to perform on the industrial application state data include data analytics, and building a data model of the industrial application associated with the industrial application state data. In various examples, the guidance device is further configured to provide workflow instructions to the end user, the instructions instructing the end user on at least one of which workpiece to operate the tool on, when to collect the industrial application state data, and when to collect the tool operation data. In many examples, providing workflow instructions to the end user causes the guidance device to update the information displayed to the end user.

According to at least one aspect of the present disclosure, a non-transitory computer readable medium containing thereon sequences of computer executable instructions for managing workflow of an industrial application is provided.

In some examples, the sequences of computer readable instructions including instructions that instruct at least one processor to provide workflow instructions to a first user, associate identification data with a workpiece, the workpiece being used in the industrial application, associate industrial application state data with one of a first industrial application state and a second industrial application state, the first industrial application state corresponding to a state of the industrial application before operation of a tool on the workpiece, and the second industrial application state corresponding to a state of the industrial application after operation of the tool on the workpiece, associate workpiece state data pertaining to the workpiece with the identification data, update at least the second industrial application state data based on tool operation data associated with the operation of a tool on the workpiece, and upload at least one of the identification data, the first industrial application state data, the second industrial application state data, and the workpiece state data to a service.

In some examples, the workflow instructions further include one or more of selecting an appropriate tool to use on the workpiece, recording the identification data associated with the workpiece, recording the industrial application state data, recording the workpiece state data, and stopping work on the workpiece pending release of a hold associated with the workpiece. In various examples, the instructions further instruct the processor to record completion of a given workflow instruction responsive to the first user indicating completion of the given workflow instruction. In many examples, the instruction further instructing the at least one processor to instruct the service to provide the data to a second user, perform data analytics on the data, the data analytics including building a data model of the workpiece, place a hold on the workpiece responsive to receiving an instruction to place the hold on the workpiece, and release the hold on the workpiece responsive to receiving an instruction to release the hold on the workpiece.

In some examples, the data includes at least one of the industrial application state data, the workpiece state data, and the tool operation data. In various examples, the second user provides the instructions to place the hold on the workpiece and to release the hold on the workpiece. In many examples, the instructions further instructing the at least one processor to instruct the service to provide the data analytics to the second user. In some examples, the instructions further instructing the at least one processor to change the workflow instructions responsive to inputs from the second user.

According to at least one aspect of the present disclosure, a system for managing workflow of an industrial application is provided. The system may comprise at least one sensor, a guidance device configured to provide instructions to a user, the instructions indicating acts of the user to perform, receive from the at least one sensor at least one of tool operation data obtained responsive to the operation of a tool, industrial application state data, and workpiece state data, and provide at least one of the tool operation data, the industrial application state data, and the workpiece state data to a service, and a service configured to receive at least one of the tool operation data, the industrial application state data, and the workpiece state data, perform data analytics on received data, including generating a data model associated with the workpiece, place a hold on the workpiece, release the hold from the workpiece, and audit the received data.

In some examples, the tool operation data is associated with the operation of the tool and is received by the guidance device from the at least one sensor in communication with the guidance device, the at least one sensor being configured to monitor the operation of the tool to produce the tool operation data. In various examples, there is a local client configured to communicate with the guidance device and the service, the guidance device providing the at least one of the tool operation data, the industrial application state data, and the workpiece state data to the local client, and the local client providing the at least one of the tool operation data, the industrial application state data, and the workpiece state data to the service.

In some examples, the local client is further configured to provide updated data to the guidance device in response to receiving at least one of the industrial application state data, the workpiece state data, the tool operation data, data indicative of the hold being placed on the workpiece, and data indicative of the hold being released from the workpiece. In many examples, the industrial application state data includes a first industrial application state data and a second industrial application state data, the first industrial application state data corresponding to a state of the industrial application prior to operation of the tool on the workpiece, and the second industrial application state data corresponding to a state of the industrial application after operation of the tool on the workpiece.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
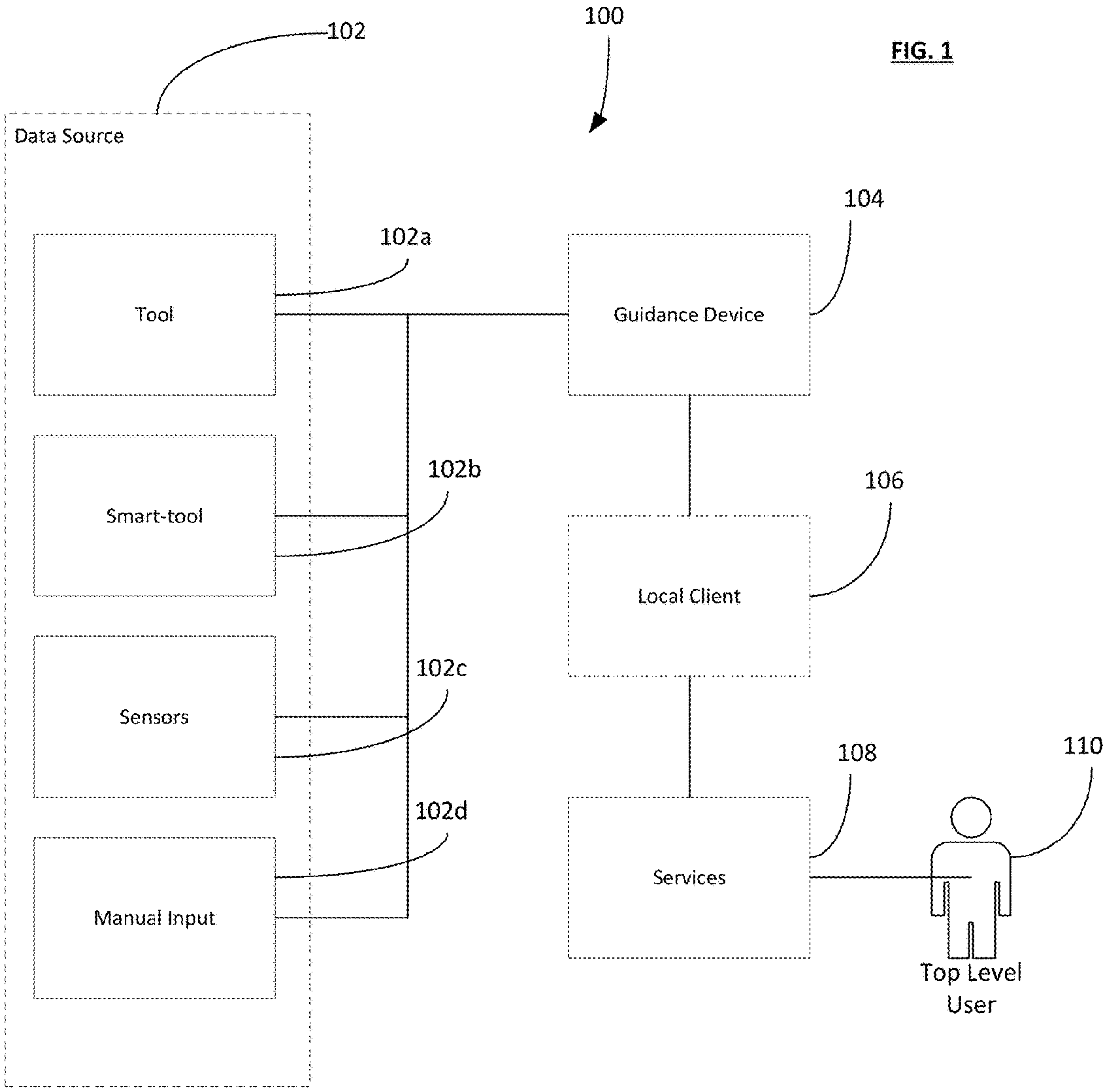
FIG. 1 illustrates a block diagram of an industrial application management system.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Industrial applications include a wide array of facilities, systems, and devices in use in various industries. For example, industrial applications include large-scale facilities, such as off-shore refineries, chemical processing plants, oil pipelines, and so forth. Industrial applications may also include smaller-scale devices and apparatuses, such as pressure chambers, stills, and so forth.

Current industrial application management systems are inefficient and costly. Existing industrial application management systems result in poor record keeping, for example due to conflicts between individual contractors and the systems the contractors use to record industrial application data. Likewise, poor or ineffective training programs may prevent workers from properly carrying out their tasks, resulting in errors that are difficult to detect and costly. Unqualified inspectors may not properly audit an industrial application worksite, thereby not identifying worker errors. Inadequate and decentralized record-keeping practices make it difficult to properly monitor errors as they arise, or to identify error patterns (e.g., a worker who consistently under- or over-torques bolts on a flange).

For example, in refineries and chemical plants (two types of industrial application), ineffective joint management procedures may be costly. Industry data shows that up to 19% of Loss of Primary Containment (LOPC) events, such as leaks, are caused by leaking bolt joints and flange leaks. These leaks can cost facilities $3 million or more per year, not including production and disaster losses, and may release hundreds of millions of metric tons of greenhouse gasses into the atmosphere, or leak chemicals into ground water reservoirs and aquifers, and so forth.

Accordingly, improved systems and techniques for industrial application management are needed. The systems and techniques disclosed herein may reduce the likelihood of adverse and costly events, such as LOPC events, improve the ability of owners and operators of industrial applications to identify and predict where failures may occur, reduce overhead and paperwork, and so forth.

FIG. 1 illustrates a block diagram of an industrial application management system (IAMS) 100 according to an example. IAMS 100 includes one or more data sources 102, one or more guidance devices 104, an optional local client 106, and services 108. Also shown is a top level user 110, though it will be appreciated that IAMS 100 may support multiple top level users. The data sources include a tool 102*a*, a smart-tool 102*b*, sensors 102*c*, and/or manual input 102*d*.

The one or more data sources 102 are communicatively coupled to the guidance device 104. The guidance device 104 is communicatively coupled to the local client 106. The local client 106 is communicatively coupled to the services 108. The services 108 may provide information pertaining to the industrial application to the top level user 110 via any appropriate interface. It will be appreciated that if the optional local client 106 is not present, the guidance device 104 may be communicatively coupled to the services 108.

The one or more data sources 102 provide data to the guidance device 104. The one or more data sources 102 may provide any kind of the data to the guidance device 104, however, in some examples, the one or more data sources 102 may provide data including industrial application state data, workpiece identification data, tool operation data, and other forms of data that will be discussed in greater detail below. In some examples, the one or more data sources 102 may also receive instructions, such as requests to provide data, from the guidance device 104.

The guidance device 104 performs multiple functions. As previously described, the guidance device 104 can receive data from the one or more data sources 102, and may send instructions to the one or more data sources 102. In addition, the guidance device 104 may provide an end user (for example, a worker, supervisor, and/or on-site engineer who is using and/or equipped with the guidance device 104) with instructions to perform. For example, the guidance device 104 may instruct the end user to collect a particular type of data, or to inspect a particular workpiece, or to perform a particular task. The guidance device 104 may also notify the end user of stop-work orders, for example, due to a hold being placed on a workpiece or due to some potential error or problem having been identified which requires the end user to stop work on the industrial application. The guidance device 104 may also provide data to the local client 106 and/or services 108: for example, the guidance device may provide industrial application state data, workpiece identification data, tool operation data, and any other type of data. The guidance device 104 will be discussed in greater detail herein.

The optional local client 106 may be used when access to the services 108 is not available, and/or when data processing functions are desired to be performed on a local network (for example, a secured local network not connected to the internet). The local client 106 may receive data from the guidance device 104 and provide data and/or instructions to the guidance device 104. For example, when more than one guidance device 104 is in use, the local client 106 may aggregate data received from each guidance device 104, and then propagate the updated data to each guidance device 104. The local client 106 may also be configured to perform any function the services 108 may perform.

The services 108 may aggregate data collected by the one or more data sources 102, and may perform data analytics on the data. For example, the services 108 may construct data models for the industrial application and/or workpieces used in the industrial application. The data models may predict when maintenance is due, which workpieces or parts of the industrial application are likely to fail, and so forth. The services 108 may also provide the top level user 110 with data for display via an interface. Potential interfaces and modes of display will be discussed in greater detail below. The services 108 may also receive inputs, including instructions, from the top level user 110. For example, responsive to receiving data pertaining to a workpiece, the top level user 110 may place a hold on the workpiece, requiring that at least some work stop. The services 108 may then transmit the stop work order to the local client 106 and/or the guidance device 104, and the guidance device 104 may then inform the end user to stop work. The services 108 may also automatically classify received data, maintain databases of the data, and so forth. The services 108 may be implemented on a server, a distributed cloud-based architecture, a computer, and so forth. The services will be discussed in greater detail below.

In the foregoing example, it will be appreciated that the one or more data sources 102 may include data sources other than tools 102*a*, smart-tools 102*b*, sensors 102*c*, and manual input 102*d*. For example, any device or system capable of gathering the necessary data may be used.

It will also be appreciated that more than one guidance device 104 may be in use at any time, and that each guidance device 104 may be communicatively coupled to each other guidance device 104. Information may flow in either an upstream and/or downstream direction. For example, when flowing in an upstream direction the information may flow from the data source 102 to the guidance device 104. The guidance device 104 could continue to transmit information in an upstream direction, for example to the local client 106 and/or the services 108, and so forth. When flowing in a downstream direction, the information may flow from the services 108 to the local client 106 and/or guidance device 104, or, in another example of downstream data flow, from the guidance device 104 to the one or more data sources 102. Information may flow bidirectionally as well, such that downstream and upstream data communication is occurring substantially simultaneously. Likewise, one or more local client 106 or services 108 may be used as well, and one or more top level users 110 may access or receive data.

FIGS. 2A-2E illustrate block diagrams of methods and techniques relating to industrial application management systems according to an example.

Figure 2A:
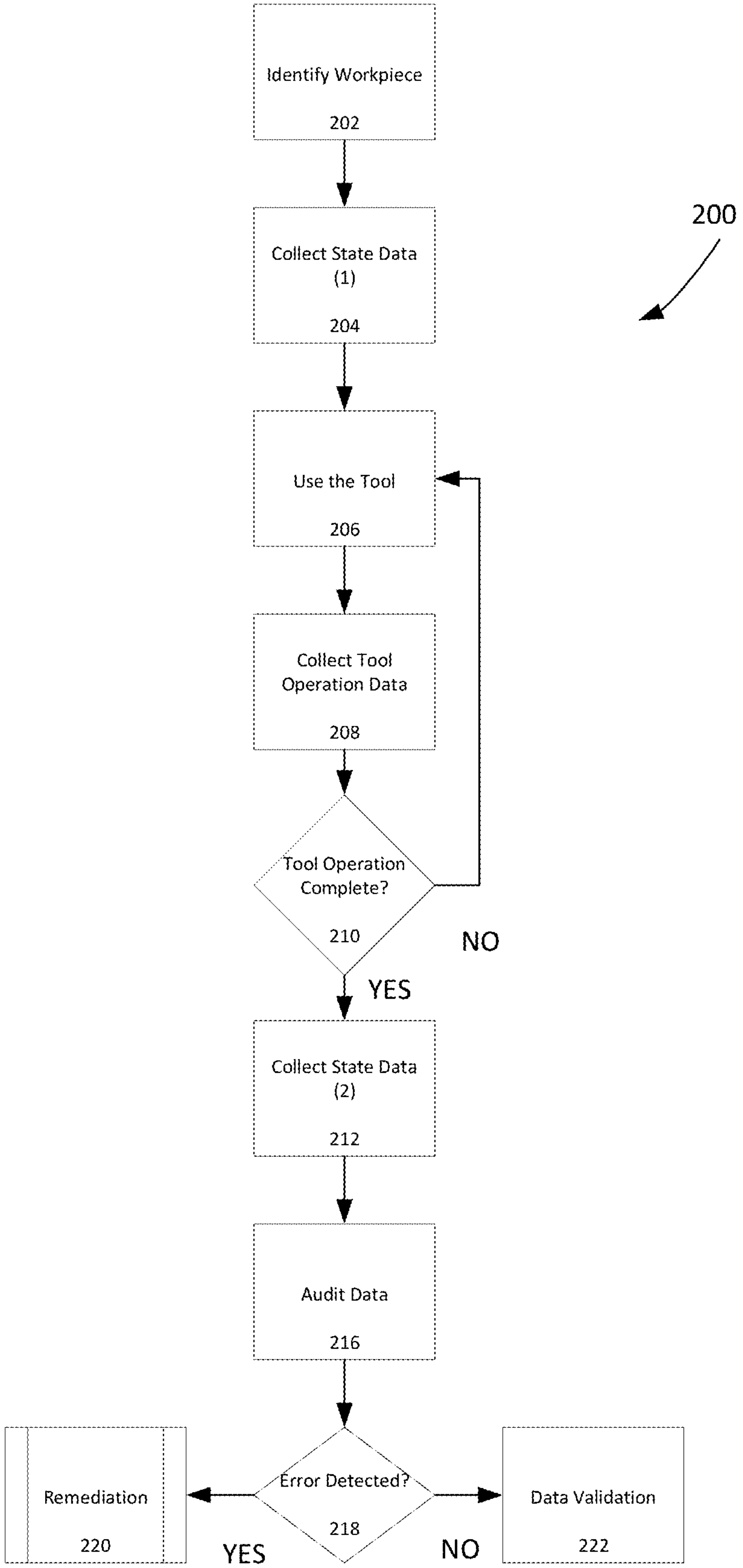
FIG. 2A illustrates a block diagram of a workflow process for managing an industrial application.

FIG. 2A illustrates a block diagram of a workflow process 200 for managing an industrial application according to an example.

In the first act 202, the end user identifies a workpiece to be worked upon. The end user may receive instructions via the guidance device (for example, guidance device 104) instructing the end user to find a particular workpiece or a known workpiece. The end user may find the workpiece and particularly identify it, for example by recording workpiece identification data. In some examples, the workpiece identification data will correspond to a unique workpiece (that is, the workpiece identification data will correspond to one and only one workpiece). In other cases, the workpiece identification data may correspond to multiple workpieces, for example, a plurality of related workpieces. In some examples, the end user may record one or more of a location of the workpiece, serial number corresponding to the workpiece, one or more photographs of the workpiece, workpiece state data corresponding to the state of the workpiece at a given moment in time and/or before or after a given event, and so forth. Any data that might be used to identify the workpiece may be recorded. The workpiece state data may also include data indicating that the workpiece is damaged, flawed, or otherwise potentially unsuitable for use in the industrial application. Such a "flag" may be relayed to a top level user or the services (for example, services 108), and a hold may be placed on the workpiece to prevent the workpiece from being used prior to an evaluation of the workpiece. The workpiece identification data and workpiece state data may be recorded on the guidance device, and may be transmitted via the guidance device to data sources, other guidance devices, local clients, services, top level users, or others.

It will be appreciated that the workpiece may be any object that may be operated on by a tool as a part of the industrial application. For example, the workpiece may be a nut, bolt, fitting, fastening, wire, pipe, gauge, valve, beam, filter, or any other such device.

At act 204, the end user collects state data corresponding to one or more of the industrial application and/or the workpiece. Other data may also be collected. The industrial application state data collected at act 204 may correspond to the state of the industrial application prior to operation of a tool, for example, operation of the tool on the workpiece identified at act 202. The workpiece state data collected may correspond to the state of the workpiece prior to operation of the tool, for example, operation of the tool on the workpiece identified at act 202. It will be appreciated that the workpiece state data may be collected during this act, act 202, or another act. However, whenever state data of any type is collected, this may also correspond to updating the state data previously collected or providing additional or new state data to be associated with the previously collected state data. In some examples, the industrial application state data will primarily relate the state of the industrial application proximate to the workpiece. In these examples, the term "proximate" may mean physically proximate, or may mean functionally proximate, that is, that the workpiece and the industrial application state data are closely related in the functions they perform (for example, a conveyer belt hauling waste for a shredder may need to deposit the waste in the shredder, and thus the parts are functionally proximate as the operation of each is related). In some cases, the state data collected at act 204 may be transmitted via the guidance device to the data sources, local clients, other guidance devices, and/or services, and so forth.

At act 206, the end user operates a tool on the workpiece. The tool may be any type of tool. For example, the tool may be a smart-tool with inbuilt sensors, an ordinary tool with no "smart" functionality, and so forth. Those of skill in the art will recognize that certain tools are suitable for certain tasks, for example using a wrench to tighten a bolt, or using a voltmeter to measure a voltage differential. Any suitable tool may be used on the workpiece, though in some examples the end user may receive instructions to use a particular tool on the workpiece. The end user may also receive tool operation instructions on how to use the tool on the workpiece, for example tool operation instructions instructing the end user on when to use the tool, what motion to operate the tool through (for example, how many times to turn the tool), and so forth. The tool operation instructions may be displayed and/or received via the guidance device.

At act 208 the end user collects tool operation data. Tool operation data corresponds to the use of the tool on the workpiece. For example, tool operation data may include an indication of how many turns a wrench made on the workpiece, and/or how resistant the workpiece is to further manipulation. In general, the tool operation data may be obtained through any data source, for example any of the data sources 102 in FIG. 1. It will be appreciated that the tool operation data need not be obtained by the tool directly. In some examples, a smart-tool may provide tool operation data directly to the guidance device. In other examples, a separate sensor (for example, a torque sensor, pressure gauge, thermometer, and so forth) may be used to acquire the tool operation data. In other examples, the end user may determine the tool operation data on their own (i.e., manually). It will be appreciated that collection of the tool operation data may be a continuous process. For example, the tool operation data may be collected and/or updated continuously while the tool is operated on the workpiece. In some examples, the data source provides the tool operation data to the end user in real time, so that the end user may adjust operation of the tool depending on the tool operation data. The tool operation data may be provided by the tool, sensor, or other data source to the guidance device, and the guidance device may display the tool operation data to the end user or transmit the tool operation data to the local client, services, other guidance devices, and so forth.

At act 210, it is determined whether operation of the tool is complete, or whether further operation of the tool is required. Determining whether operation of the tool is complete may be a manual process, wherein the end user evaluated the tool operation data to determine whether further operation of the tool is required, or may be an automatic process. For example, in an automatic process, the tool operation data may be provided to the guidance device, and the guidance device may determine when a threshold of tool operation is reached and no further tool operation is required. For example, the guidance device may receive tool operation instructions instructing it to identify when the tool has been sufficiently operated and no further operation is required and/or desired. If no further operation is required, the process 200 continues to act 212. If further operation of the tool is required, the process 200 returns to act 206 and may repeat steps 206 through 210 until operation of the tool is completed or an error is detected and a hold placed on the workpiece.

At act 212, state data is collected. The state data may be substantially similar to the state data collected during act 202 and/or act 204. For example, the state data may include workpiece identification data, industrial application state data, workpiece state data, and so forth. In some examples, the state data collected will be modified according to the tool operation data, for example, to reflect the changes in the workpiece and/or industrial application caused by the operation of the tool. As shown in FIG. 2A, Act 212 occurs after operation of the tool. Accordingly, the state data collected will correspond to the state of the industrial application and/or workpiece after operation of the tool.

At act 216, any data collected during the process 200 may be audited to detect errors and to verify the correctness of the data. For example, photographs of workpieces and industrial application's proximate to the workpiece, may be examined to ensure that the correct workpiece was operated on, or that the data sources indicated the tool was correctly operated, and so forth. The services and/or local clients may also evaluate the collected data to construct data models and perform data analytics to assist in the evaluation of the collected data. The services and/or local clients and/or guidance devices may make the collected data, data analytics, data models, and/or other data available to end users, top level users, or others.

At act 218, it is determined whether an error occurred. The determination of whether an error occurred may be made automatically, for example by the services performing analysis on the data set and flagging problems, or manually, for example by an inspector, engineer, auditor, and so forth. If an error is determined to have occurred, the process 200 proceeds to remediation (200 YES). If an error did not occur, the process 200 proceeds to data validation (200 NO).

At act 220, an error was determined to have occurred and the process 200 proceeds to a remediation step to correct the error. One example of remediation is discussed in greater detail with respect to FIG. 2E, below.

At act 222, the data is validated. Finishing operations may be performed on the data, and the services may continue to use the collected data to build data models and monitor performance or the state of the industrial application or workpiece. Once the collected data is validated at act 222, the collected data is considered canonical (that is, true and/or representative of the actual state of the industrial application and/or workpiece).

Figure 2B:
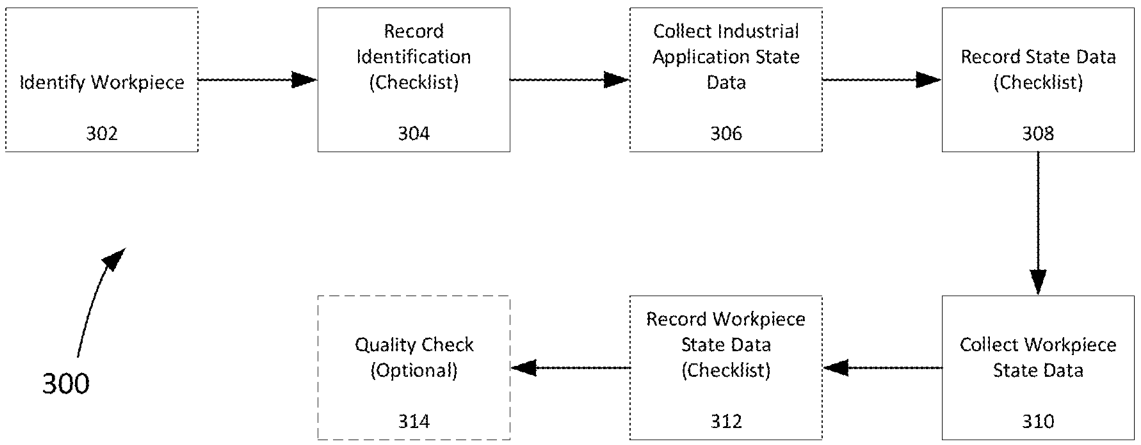
FIG. 2B illustrates a block diagram of a process for collecting state data prior to operation of a tool.

FIG. 2B illustrates a block diagram of a process 300 for collecting state data prior to operation of a tool according to an example. In some examples, process 300 may be suitable to replace acts 202 and 204 of process 200 of FIG. 2A.

At act 302, the end user identifies a workpiece. The end user may identify the workpiece in a substantially similar manner as described in act 202 of FIG. 2A, for example by collecting workpiece identification data that may uniquely identify the workpiece. At act 304, the end user records the workpiece identification data according to a checklist, prompt, or other set of requirements for the workpiece identification data. For example, the end user may be prompted to input and/or verify the type of workpiece, serial number of workpiece, dimensions of the workpiece, material of the workpiece, and so forth. In some examples, the end user need not verify every requirement, but may only verify a subset of requirements. In some examples, the end user may ignore certain requirements entirely. Once the end user has completed verifying the requirements, the verified requirement data may be memorialized and recorded, for example, by the guidance device.

At act 306 the end user collects the industrial application state data. The industrial application state data may be substantially similar to the industrial application state data collected at act 204 of process 200 of FIG. 2A. At act 308, the end user records the industrial application state data according to a checklist, prompt, or other set of requirements for the industrial application state data. For example, the end user may be prompted to input and/or verify the state data. In some examples, the end user need not verify every requirement, but may only verify a subset of requirements. In some examples, the end user may ignore certain requirements entirely. Once the end user has completed verifying the requirements, the verified requirement data may be memorialized and recorded, for example, by the guidance device.

At act 310, the end user collects the workpiece state data. The workpiece state data may be substantially similar to the workpiece state data collected at act 202 of process 200 of FIG. 2A. At act 312, the end user records the workpiece state data according to a checklist, prompt, or other set of requirements for the workpiece state data. For example, the end user may be prompted to input and/or verify the state data. In some examples, the end user need not verify every requirement, but may only verify a subset of requirements. In some examples, the end user may ignore certain requirements entirely. Once the end user has completed verifying the requirements, the verified requirement data may be memorialized and recorded, for example, by the guidance device.

At optional act 314, a quality check may be performed by the end user, a top level user, or automatically by the services, guidance devices, and/or local clients. The quality check may include an audit of the data so far collected. Errors may be identified and flagged for correction. For example, if a necessary or important requirement is not verified during acts 304, 308, or 312, the services may raise a flag indicating that a top level user or end user needs to review the requirement. In some examples, a top level user reviewing the requirement may determine that the requirement warrants placing a hold on the workpiece and performing remediation, such as the remediation process described in FIG. 2E. Likewise, in some examples, the services, local client, or guidance device may automatically determine that a hold should be placed on the workpiece and that remediation is required before further work is completed.

Figure 2C:
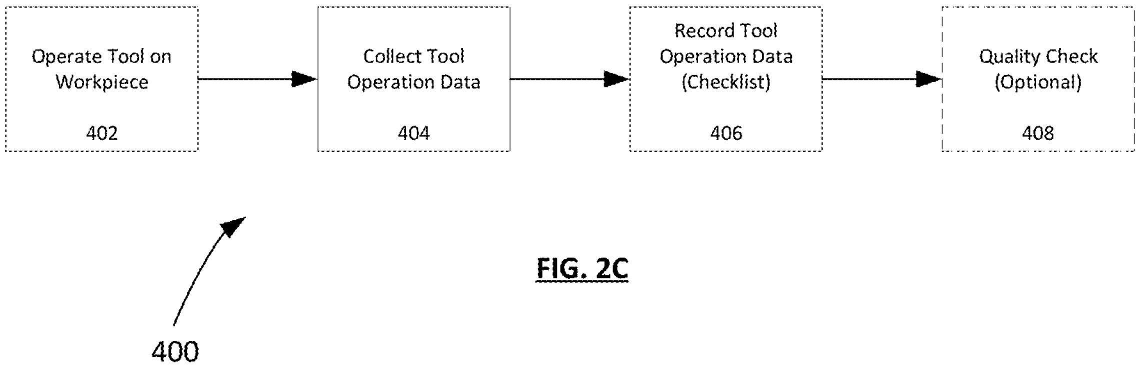
FIG. 2C illustrates a block diagram of a process for collecting tool operation data.

FIG. 2C illustrates a block diagram of a process 400 for collecting tool operation data according to an example. Process 400 may replace or supplement acts 206 through 210 of process 200 of FIG. 2A.

At act 402 the end user operates the tool on the workpiece. The end user may operate the tool in a manner substantially similar to that described in act 206 of process 200 of FIG. 2A. At act 404, the tool operation data is collected. The tool operation data may be collected in a substantially similar manner to that described in act 208 of process 200 of FIG.

2A. At act 406, the end user records the tool operation data according to a checklist, prompt, or other set of requirements for the tool operation data. For example, the end user may be prompted to input and/or verify the tool operation data. In some examples, the end user need not verify every requirement, but may only verify a subset of requirements. In some examples, the end user may ignore certain requirements entirely. Once the end user has completed verifying the requirements, the verified requirement data may be memorialized and recorded, for example, by the guidance device.

At optional act 408, a quality check may be performed by the end user, a top level user, or automatically by the services, guidance devices, and/or local clients. The quality check may include an audit of the data so far collected. Errors may be identified and flagged for correction. For example, if a necessary or important requirement is not verified during act 406, the services may raise a flag indicating that a top level user or end user needs to review the requirement. In some examples, a top level user reviewing the requirement may determine that the requirement warrants placing a hold on the workpiece and performing remediation, such as the remediation process described in FIG. 2E. Likewise, in some examples, the services, local client, or guidance device may automatically determine that a hold should be placed on the workpiece and that remediation is required before further work is completed.

Figure 2D:
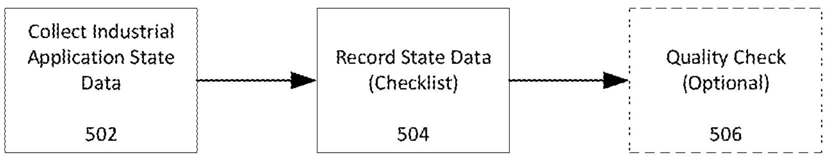
FIG. 2D illustrates a block diagram of a process for collecting state data after operation of a tool.

FIG. 2D illustrates a block diagram of a state data collection process 500 according to an example. Process 500 may be suitable to supplement and/or substitute act 212 of process 200 of FIG. 2A.

At act 502, the end user collected the industrial application state data. The end user may collect the industrial application state data in a manner substantially similar to that described in act 212 and/or 204 of process 200 of FIG. 2A. At act 504, the end user records the industrial application state data according to a checklist, prompt, or other set of requirements for the tool operation data. For example, the end user may be prompted to input and/or verify the collected data. In some examples, the end user need not verify every requirement, but may only verify a subset of requirements. In some examples, the end user may ignore certain requirements entirely. Once the end user has completed verifying the requirements, the verified requirement data may be memorialized and recorded, for example, by the guidance device.

At optional act 506, a quality check may be performed by the end user, a top level user, or automatically by the services, guidance devices, and/or local clients. The quality check may include an audit of the data so far collected. Errors may be identified and flagged for correction. For example, if a necessary or important requirement is not verified during act 506, the services may raise a flag indicating that a top level user or end user needs to review the requirement. In some examples, a top level user reviewing the requirement may determine that the requirement warrants placing a hold on the workpiece and performing remediation, such as the remediation process described in FIG. 2E. Likewise, in some examples, the services, local client, or guidance device may automatically determine that a hold should be placed on the workpiece and that remediation is required before further work is completed.

Figure 2E:
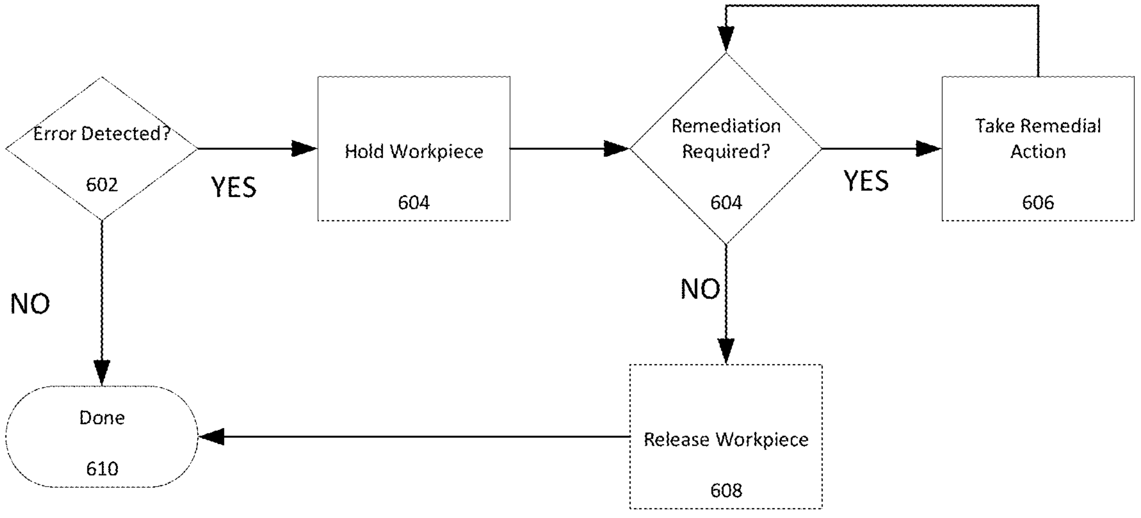
FIG. 2E illustrates a block diagram of a remediation process for fixing errors in the industrial application.

FIG. 2E illustrates a block diagram of a remediation process 600 according to an example. The remediation process 600 may supplement or replace act 220 of process 200 of FIG. 2A. The remediation process 600 is also an example of a remediation process suitable to follow any quality check as described with reference to FIGS. 2B-2D, or under any other circumstance where an error may occur.

At act 602, the collected data is analyzed for errors. The collected data may include any or all of the tool operation data, industrial application state data, workpiece state data, workpiece identification data, and so forth. In some examples, data models produced by data analytics, such as the data analytics provided by the services, may also be used to determine and/or predict whether an error is likely to be present or to have occurred. In some examples, if an error is detected, a flag is raised (or set). The flag may be raised manually, for example by an end user or top level user, or automatically, for example by the services, local clients, or guidance devices. The flag may be associated with a workpiece, and may indicate that a hold should be placed on the workpiece. The flag does not necessarily indicate that an error has occurred, but may instead indicate that an additional quality check or review of the workpiece is required to verify whether an error has occurred. In some examples, however, the flag may indicate that the error has occurred. It will be appreciated that, although the term “flag” is used, flag does not necessarily refer to a physical flag. Flag may refer to a software flag, such as when a variable or value is set such that the services, local client, or guidance device respond by marking the workpiece associated with the flag as requiring review and/or remediation. In this way, the flag may be used to propagate the status of a potential error through the entire workflow system, for example the system described in FIG. 1.

If no error is detected (602 NO), process 600 may proceed to act 610. If an error is detected (602 YES), the process 600 proceeds to act 604.

At act 604, a hold is placed on the workpiece. The hold placed on the workpiece ensures that no tool is operated on the workpiece until an evaluation of the workpiece is complete and remediation carried out, if necessary. The hold may be placed on the workpiece manually, for example by the end user or a top level user, or automatically, for example, by the services, local client, or guidance device. While a hold is on a workpiece, other workpieces may also be affected. For example, it may not be appropriate to work on a second workpiece until the flagged workpiece is reviewed and remediated. In such cases, a contingent flag may be set on the second workpiece, such that a hold is placed on the second workpiece pending resolution of the hold placed on the flagged workpiece. In some examples, a contingent flag will be removed automatically when the flagged workpiece is reviewed and released, as described below in acts 604, 606, and 608. However, contingent flags may be removed manually or automatically by an end user, top level user, or the services, guidance devices, or local clients, depending on an evaluation of the second workpiece. For critical workpieces, a hold may be set irrespective of any error being detected. For example, if a workpiece serves some critical function or purpose such that the industrial application cannot function if the workpiece has an error, a hold may be set on said critical workpiece to ensure that the workpiece is reviewed prior to continuing work on other workpieces. Such an act may beneficially ensure that time and resources are not wasted due to an unnoticed or undiscovered error with a critical workpiece. In some examples, automatic holds may be placed on any workpiece for any reason, according to end user or top level user inputs, or project requirements.

At act 604 it is determined whether remediation is required. The determination of whether remediation is required may be carried out automatically by the services, guidance device, or local client, or may be carried out manually by the end user or top level user. In some examples, the services, local client, or guidance device may provide relevant data and analysis to the top level user, such that the top level user may review the reasons for the hold based on the data already collected, and then determine whether remediation is required without needing to physically inspect the workpiece in person. In some examples, an end user, supervisor, on-site engineer, inspector, or other personnel may be dispatched to the workpiece to physically inspect it. In examples where someone physically inspects the workpiece to determine whether remediation is required, the guidance device may collect data (including industrial application state data, workpiece identification data, workpiece state data, tool operation data, and so forth) related to the remediation process. The guidance device may collect some or all of the data from a data source, such as the data sources 102 of FIG. 1. In some examples, collecting remediation data may include requiring the reviewing personnel to review various requirements, such as requirements presented in a checklist or according to other instructions, and verify that the requirements are met. In this manner, the system can ensure that even poorly trained inspectors are given precise instructions on what to do and what data to collect for review in real-time and on a per-workpiece basis. It will be appreciated that the requirements and instructions described herein may be based on the needs of the industrial application. Once the remediation data is collected and/or the workpiece is inspected, the remediation data may be analyzed automatically or manually to determine if remediation is required, for example by the services and/or the top level user. In some examples, remediation is required if the workpiece does not meet certain minimum requirements related to its state, condition, operation, and so forth.

If it is determined remediation is required (606 YES), the process 600 proceeds to act 606. If it is determined that remediation is not required (606 NO), the process 600 continues to act 608.

At act 606 remedial action is taken. In some examples, remedial actions include operating the tool on the workpiece to correct an incorrect earlier operation of the tool on the workpiece. In some examples, remedial actions include replacing the workpiece. In some examples, remedial action may include more substantial acts, such as flagging the workpiece for a design-around where engineers may be required to design new elements for the industrial application to account for an irremediable flaw in the workpiece. It will be appreciated that remedial actions may be varied and differ widely, and may be inventive in their own right or previously known in the art. One the remedial action is completed, the process 600 returns to act 604, and act 604 may be repeated to determine whether additional remedial action is required. For example, further analysis like that discussed with respect to acts 602 and/or 604 may be required, since the remedial actions may have changed the state of the industrial application and/or the workpiece to an extent that the previous conditions warranting the hold no longer apply, but it is not known if there is an error with respect to the new state of the industrial application and/or the workpiece. If no new remedial action is required (604 NO), the process 600 continues to act 608.

At act 608 the hold on the workpiece is released. Any contingent holds on other workpieces may also be released. The holds may be released manually or automatically, for example by the top level user and/or by the services. The process 600 then continues to act 610.

At act 610, the process 600 is complete and the data may proceed to validation, for example, as described in act 222 of process 200 of FIG. 2A.

In the foregoing examples described in FIGS. 2A-2E, when the end user receives an instruction, prompt, or other communication and/or data, the end user may receive said instruction, prompt, communication, and/or data via the guidance device.

Figure 3:
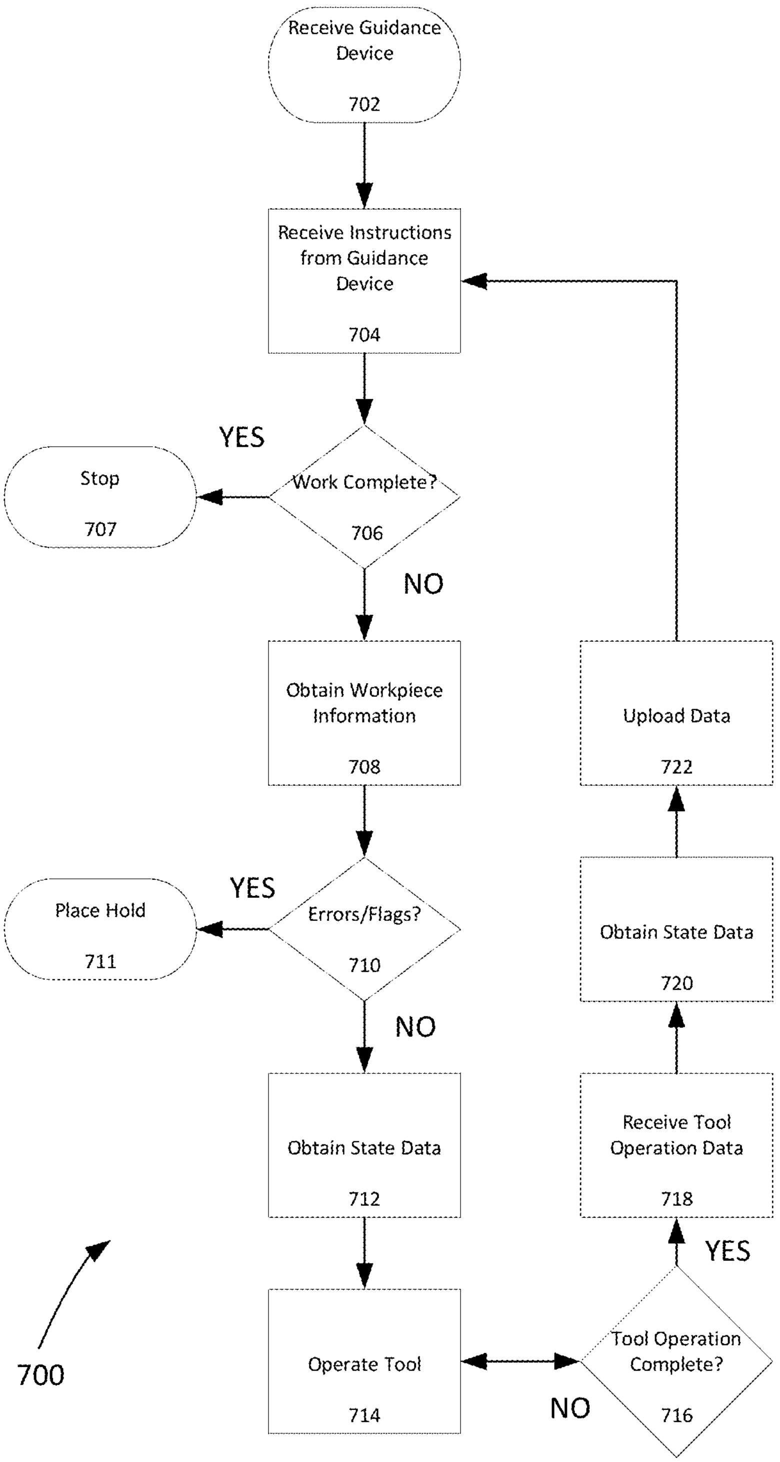
FIG. 3 illustrates a block diagram of a workflow process.

FIG. 3 illustrates a block diagram of a workflow process 700 according to an example. It will be appreciated that the process 700 may be performed in lieu of or supplemental to process 200 of FIG. 2A, and that elements and acts of process 700 are not necessarily exclusive of elements and acts of process 200.

At act 702 the end user receives (or is provided with) a guidance device. The guidance device may be any type of device capable of receiving and transmitting data by any method, though in some embodiments the preferred method may be a wireless data transmission method (for example, Bluetooth). The guidance device may include guidance device client software ("client software"). The client software may be software that communicates with the local client, services, and data sources, and may be updated remotely or manually. The client software may provide an interface allowing the end user to access functionalities corresponding to the other processes and systems described herein. For example, the guidance device may enable an end user to acquire data from data sources or to verify collected data requirement as described with respect to FIG. 1 and FIGS. 2A-2E. The client software may also provide other functions not directly related to the end user. For example, the client software may include code (such as drivers) that allow the guidance device to automatically recognize and interface with sensors, smart-tools, manual forms (e.g., via OCR processes), and other data sources. Likewise, the client software may include code allowing the guidance device to automatically recognize and interface (communicatively couple) with other guidance devices, the local client, and/or the services.

Once the end user receives the guidance device, the end user may activate the guidance device. For example, the end user may be required to login to the guidance device and/or the client software using credentials (for example, a username and password that may be unique to a particular end user, contractor, organization, and so forth). Once the end user has activated the guidance device, the process 700 proceeds to act 704.

At act 704, the end user receives workflow instructions from the guidance device. The workflow instructions may be provided by a software interface displayed on a screen of the guidance device, or may be provided in other manners. The form of the workflow instructions may vary for particular industrial applications, workpieces, or projects. The workflow instructions instruct the end user on what they are to do. The workflow instructions may include information like which workpiece the end user must work on, when the end user must perform work on the workpiece, how and when to collect state data and other data from the data sources, how to record and verify collected data, what to do when an error is identified, how to operate any tools needed to complete work, for example, work on the workpiece, and so forth. The workflow instructions may be generated automatically by the local client and/or services, or may be determined by a top level user and transmitted to the guidance device via, for example, the services and/or local client. The workflow instructions may be updated at set intervals, in real time, and so forth. Once the workflow instructions have been received, the process 700 proceeds to act 706.

At act 706 the end user determines if the guidance device indicates whether there is any work to be performed. For example, if the end user has completed all assigned work for a given time frame, the guidance device may indicate that there is no further work to do. If the end user determines that work is completed (706 YES), the process 700 continues to act 707. If the end user determines that there is still work to be completed (706 NO), the process 700 continues to act 708.

At act 707, the process 700 comes to a halt until additional work is to be performed. For example, work may stop until a timeframe is reached for which additional work is to be performed. Likewise, work may be stopped until further workflow instructions are received instructing the end user to perform a task. If further work is to be performed, the process 700 may proceed to a different act, for example, act 704 or act 702.

At act 708 the end user obtains workpiece identification data. In some examples, the end user may have received workflow instructions instructing the end user to perform work on a particular workpiece or group of workpieces. The end user may then find the relevant workpieces and record workpiece identification data pertaining to that workpiece. In some examples, the workpiece identification data obtained may be substantially similar to the workpiece identification data obtained at act 202 of process 200. The workpiece identification data may be obtained via the guidance device through any data sources, for examples, the data sources of FIG. 1. Once the workpiece identification data required by the workflow instructions is obtained and recorded on the guidance device, the process 700 proceeds to act 710.

At act 710, potential errors are identified. For example, the end user may be presented with a set of requirements for the workpiece identification data, and may be required to verify the requirements. In some examples, the end user may flag particular errors or potential errors. In some examples, the guidance device, client software, local client, and/or services may automatically identify errors and potential errors and take appropriate action. For example, if the error warrants a hold (710 YES), the process 700 may proceed to act 711 and place a hold on the workpiece the end user has identified. The hold may include flagging the workpiece, and may require remedial actions, such as those described with respect to FIG. 2E. In some examples, the process 700 may return to an earlier act after a hold is set on a workpiece. In some examples, the process 700 may return to act 704, and the guidance device may receive new instructions to provide to the end user—such as to perform remedial actions on the workpiece, or to perform work on a different workpiece. The process 700 may then continue from the earlier act as described above.

If no errors are detected (710 NO) the process 700 continues to act 712. At act 712, the end user receives instructions from the guidance device to obtain state data. The state data may include the industrial application state data, the workpiece state data, and so forth. Once the state data is obtained, the process 700 proceeds to act 714.

At act 714, the end user receives workflow instructions instructing the end user to operate the tool on the workpiece. The guidance device may provide instructions that instruct the end user in how to use the tool (or tools), in what order to use the tool(s), when to monitor use of the tool and/or receive data from a data source indicating a state of the workpiece or of the operation of the tool upon the workpiece. As with other examples provided herein, data described herein may be retrieve at discrete points in time or continuously, and may be provided to the user by the guidance device at intervals or continuously.

At act 716 the guidance device may indicate that the tool operation is complete (716 YES). Alternatively, the guidance device may indicate that the tool operation is not complete and that further tool operation is required (716 NO). If further tool operation is required, the process may return to act 714. If no further tool operation is required, the process 700 may proceed to act 718.

At act 718, the guidance device receives the tool operation data from, for example, a data source. guidance device may provide the end user with workflow instructions telling the end user what sort of tool operation data is to recorded and what to do with it. The process 700 then proceeds to act 720.

At act 720, the guidance device obtains the state data. The state data obtained may be similar to the state data obtained at act 712, but will now incorporate changes in the state of the industrial application and/or workpiece corresponding to operation of the tool and the tool operation data. The guidance device may provide workflow instructions telling the end user what sort of state data to record, in what form, order, what to do with the state data, and so forth. The process 700 then proceeds to act 722.

At act 722, the guidance device uploads the collected data to the local client, other guidance devices, and/or to the services. The guidance device may provide workflow instructions instructing the end user to authorize the upload or may upload automatically. The process 700 then continues to act 704, where the guidance device provides new workflow instructions to the end user and the process 700 may thereafter repeat from act 704.

It will be appreciated that act 710 may follow or occur concurrently with any other act of process 700. For example, after obtaining the state data at act 712, there may be a similar evaluation of the received state data to determine whether an errors occurred or potentially exist. The process 700 may, therefore, proceed to act 711 at any time following the identification of errors in act 710. In other words, at any point in the process 700 an evaluation for and/or of errors may occur, and a hold may be set on a workpiece responsive to identifying an error or potential error.

It will also be appreciated that the end user may provide a suitable device on which to install the client software. Installing the client software on a suitable device may configure the suitable device to function as a guidance device. In some examples, the guidance device and/or suitable device may be a cellphone or tablet, or other type of computer or smart-device.

Figure 4A:
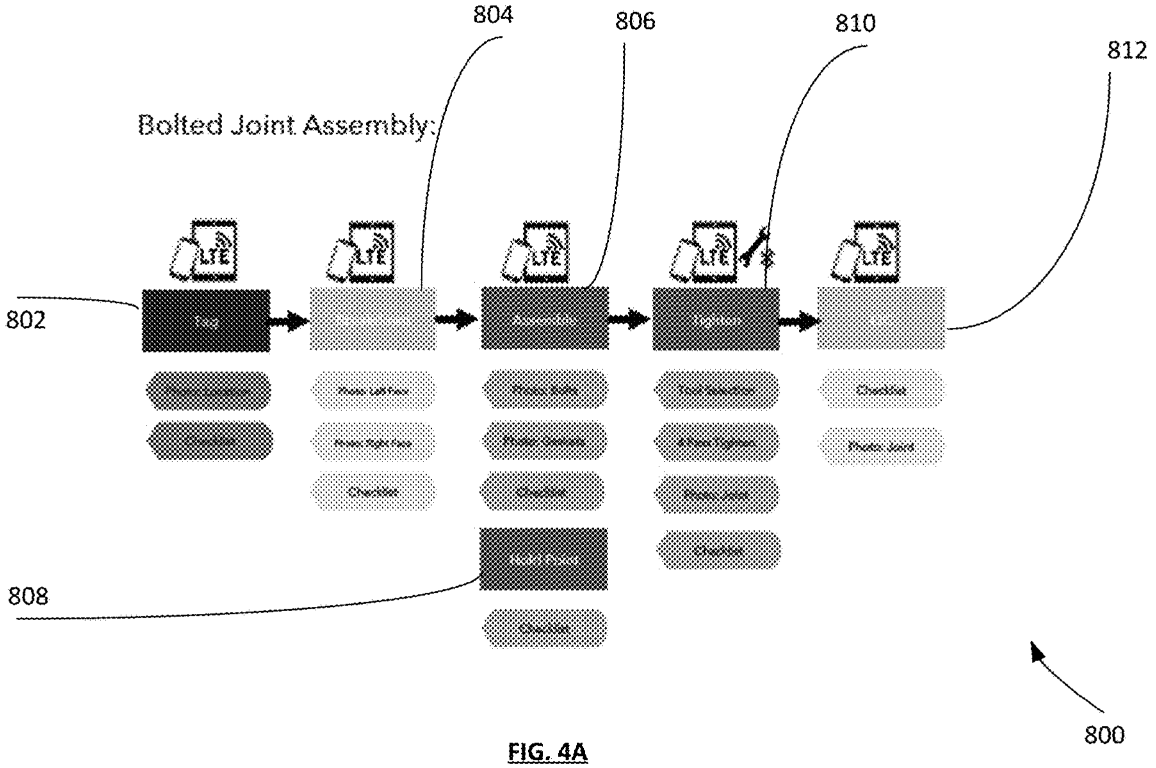
FIG. 4A illustrates a bolted joint assembly workflow.
Figure 4B:
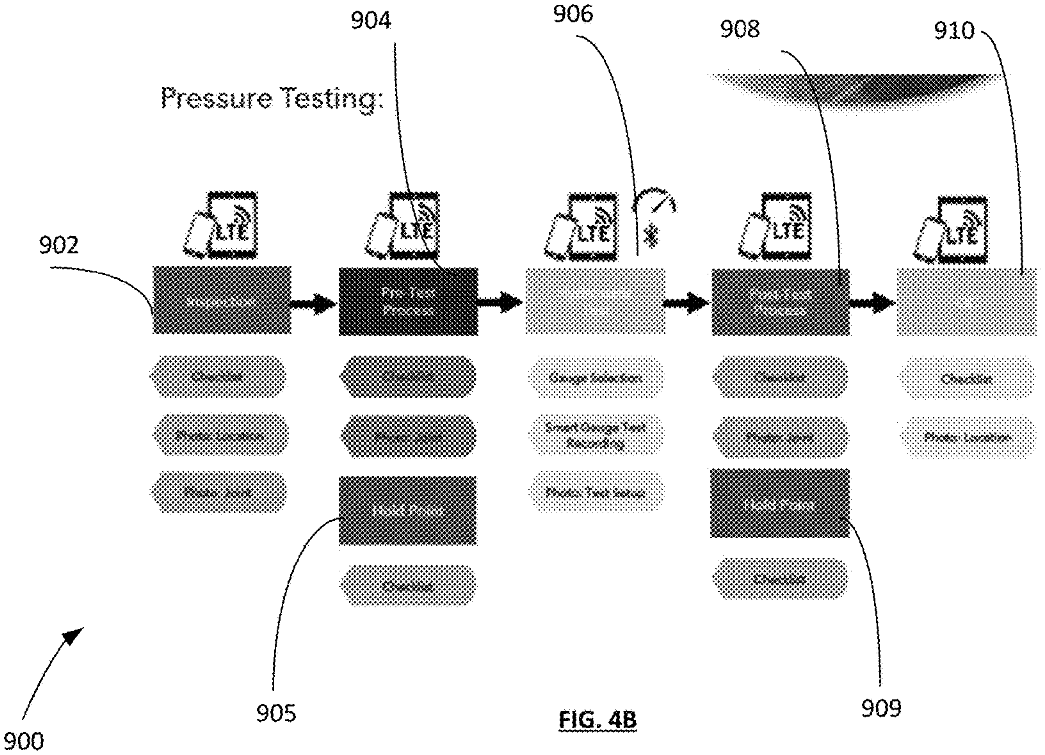
FIG. 4B illustrates a pressure testing workflow.

FIGS. 4A and 4B illustrate industrial application workflows according to examples.

FIG. 4A illustrates a bolted joint assembly workflow 800 according to an example. Workflow 800 includes a tag act 802, a breakdown act 804, an assembly act 806, a hold point 808, a tighten act 810, and a quality control act 812.

In the tag act 802, the guidance device prompts the end user to provide a photo of the location in the industrial application where the workpiece is (or will be) located. The checklist may also prompt the end user to provide other information, like a unique location identifier or any tradesman's marks. The assembly workflow 800 then proceeds to act 804.

Breakdown act 804 includes the guidance device prompting the end user to take a photo of the workpiece and to complete a checklist of requirements related to the photo. For example, the guidance device may prompt the end user to take a photo of the left and right faces of the workpiece. In some examples, the checklist may include that photos of certain angles of the workpiece (here, a bolt joint) be taken, that serial numbers be recorded, that any workman's markings at the location be recorded, and so forth. The guidance device may present the end user with the checklist, and the end user may fill it out. Alternatively, the end user may be prompted to upload data by the checklist. For example, the checklist may request a frontal photo of the workpiece, and may not advance to the next item until the photo is provided. The process 800 may then proceed to act 806.

Assemble act 806 includes the guidance device prompting the end user to assemble the necessary tools and parts. For example, the guidance device may provide workflow instructions instructing the end user to aggregate the necessary bolts and gaskets for the task, to photograph the bolts and gaskets, and to fill out a checklist or otherwise verify requirements related to the tools and parts. Once the end user has completed the assigned tasks, the process 800 may proceed to act 808.

At act 808, a hold is placed on the workpiece and any tasks or work previously completed may be reviewed. For example, the end user, supervisors, guidance device, local client, services, and/or top level users may review the data thus far collected, for example the photos of the workpiece, the bolts, and the gaskets, and perform a quality check to ensure that no remedial actions are necessary. Act 808 may be optional. Furthermore, a quality check may occur at any point in the assembly workflow 800 and need not occur only after the assemble act 806. Once the quality check is complete, the workpiece may be released and the assembly workflow 800 may proceed to act 810.

At tighten act 810 the guidance device provides workflow instructions to the end user instructing the end user to tighten the workpiece by, for example, tightening the bolts or gaskets. The workflow instructions may instruct the end user to select a particular tool or type of tool, perform a 4-pass tighten (where the end user tightens the workpiece in a specific manner four times), take photos of the work performed, for example of the bolted joint, and then fill out a checklist or verify a set of requirements. Once tighten act 810 is complete, the process 800 proceeds to act 812.

At quality check act 812, the data collected during any of the other acts may be provided to the local client, services, or other guidance devices. The collected data may be analyzed by the guidance device(s), local client, services, top level users, other end users, and so forth, and may be evaluated for potential errors and actual errors. The guidance device may provide the end user with a checklist of requirements to be verified prior to completion of the quality check, and instructions on how to verify each requirement. If further evaluation or data is required, the guidance device may provide workflow instructions instructing the end user to collect additional data, such as photos of the bolted joint. The collected data may be further reviewed and used to validate the work performed by the end user, or be analyzed for errors.

FIG. 4B illustrates a pressure testing workflow 900 according to an example. The pressure testing workflow 900 includes an inspection act 902, a pre-test process act 904, a hydrostatic test act 906, a post-test process act 908, a quality control act 910, and two hold point acts 905, 909.

At inspection act 902, the guidance device may provide workflow instructions to the end user to inspect a workpiece, for example a valve, pipe, or other device under pressure. The guidance device may provide a checklist of requirements to be verified, and may require the end user provide photos of the location of the workpiece. The guidance device may also require any of the other workpiece identification data. Once the guidance device receives the requested data, process 900 may proceed to act 904.

At act 904, the guidance device may provide workflow instructions to the end user prompting the end user to prepare to test the workpiece. For example, the guidance device may prompt the end user to verify that necessary tools are present, that the correct workpiece and (if necessary) replacement parts are present, that the correct data sources are present, and so forth. The workflow instructions may also instruct the end user to calibrate the data sources, or perform other preparatory tasks. The pressure testing workflow process 900 may then proceed to act 905.

At act 905, a hold may be placed on the workpiece placing a quality check. The quality check may be substantially similar to the quality check performed in act 808 of process 800 of FIG. 4A. The quality check may verify that the pre-test process and inspection acts 904, 902, were properly performed before the hold is lifted on the workpiece. Once the hold on the workpiece is lifted, the process 900 may proceed to act 906.

At act 906, the guidance device provides workflow instructions instructing the end user to perform a hydrostatic pressure test to verify that the workpiece is under the correct amount of pressure or, in some examples, correctly maintaining or handling a given pressure. The workflow instructions may include instructions instructing the end user to select a particular gauge (for example, a pressure sensor) to use to measure the pressure. The workflow instructions may further instruct the end user to verify that the gauge is properly communicating with the guidance device, and/or may prompt the end user to being recording the gauges output as it is used to sense the pressure associated with the workpiece. The workflow instructions may further instruct the end user to collect additional data, for example industrial application state data, tool operation data, and/or workpiece state data corresponding to the pre and/or post-pressure test state of the workpiece and/or industrial application. For example, the guidance device may instruct the end user to take photos of the pressure test setup prior to performing the pressure test. The workflow 900 may then proceed to act 908.

At act 908, the guidance device provides workflow instructions prompting the end user to collect industrial application state data, workpiece state data, the tool operation data, and so forth. The guidance device may, for example, prompt the end user to take photos of the workpiece after the pressure test is complete.

At act 909, a hold may be placed on the workpiece pending a quality check. The quality check may be substantially similar to the quality check performed in act 808 of process 800 of FIG. 4A. The quality check may verify that the preceding acts 906, 908 were properly performed before the hold is lifted on the workpiece. Once the hold on the workpiece is lifted, the process 900 may proceed to act 910.

At act 910 the data collected during any of the other acts may be provided to the local client, services, or other guidance devices. The collected data may be analyzed by the guidance device(s), local client, services, top level users, other end users, and so forth, and may be evaluated for potential errors and actual errors. The guidance device may provide the end user with a checklist of requirements to be verified prior to completion of the quality check, and instructions on how to verify each requirement. If further evaluation or data is required, the guidance device may provide workflow instructions instructing the end user to collect additional data, such as photos of the bolted joint. The collected data may be further reviewed and used to validate the work performed by the end user, or be analyzed for errors.

It will be appreciated that once the quality control acts 812, 910 are complete and the data validated, the collected data may be treated as the canonical data regarding the associated workpiece.

Figure 5A:
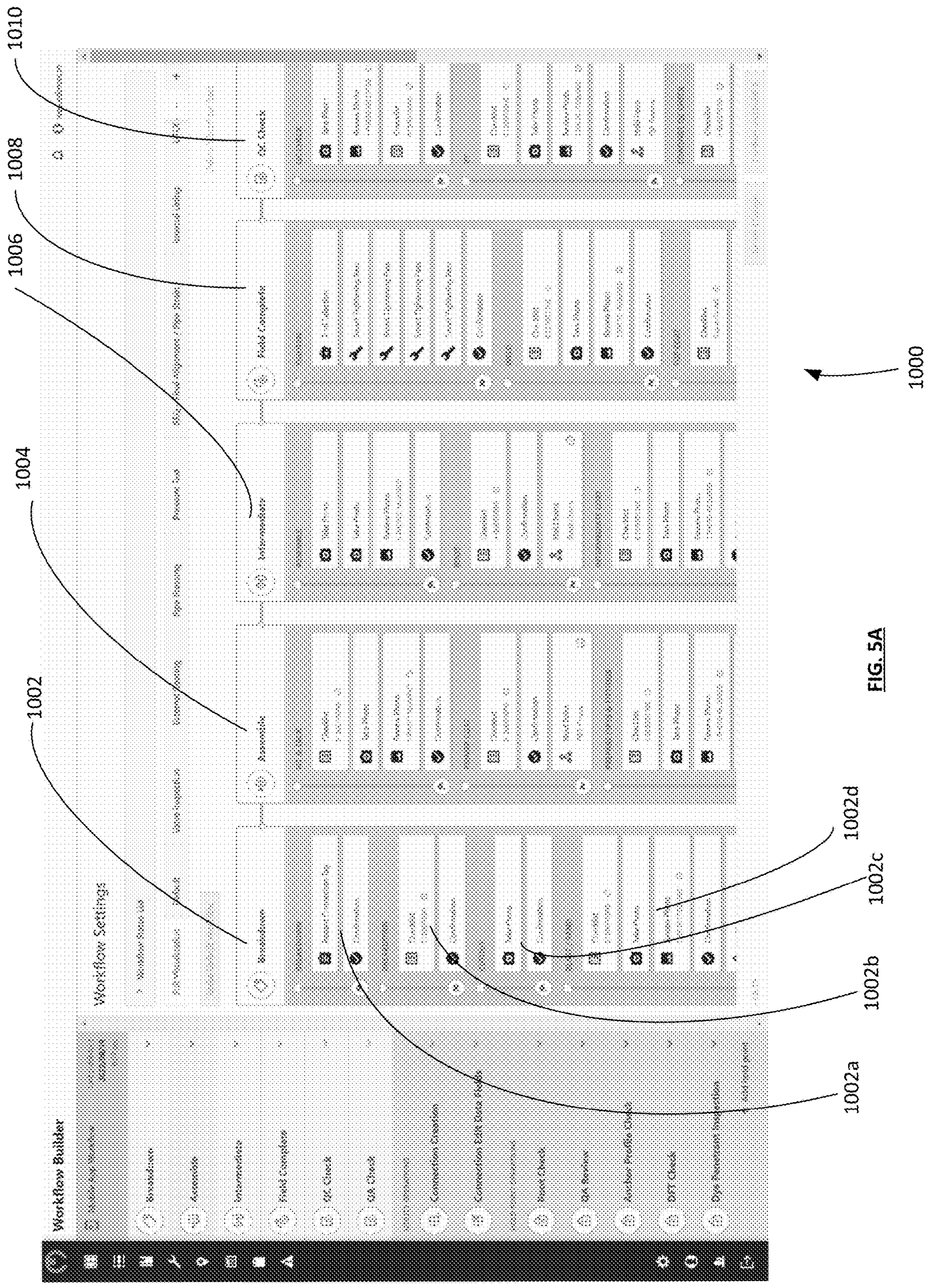
FIG. 5A illustrates a workflow builder interface.
Figure 5B:
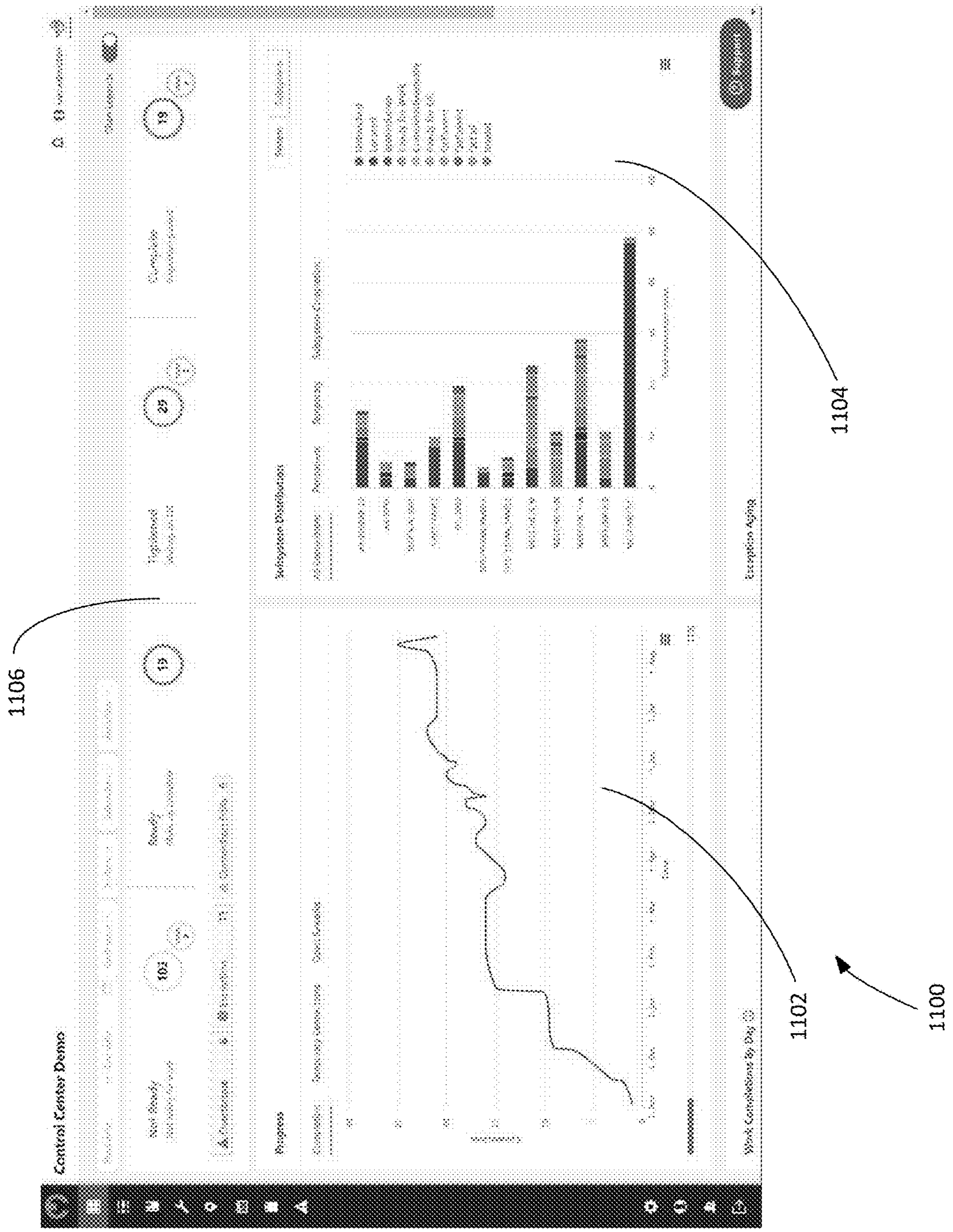
FIG. 5B illustrates a control center interface.
Figure 5C:
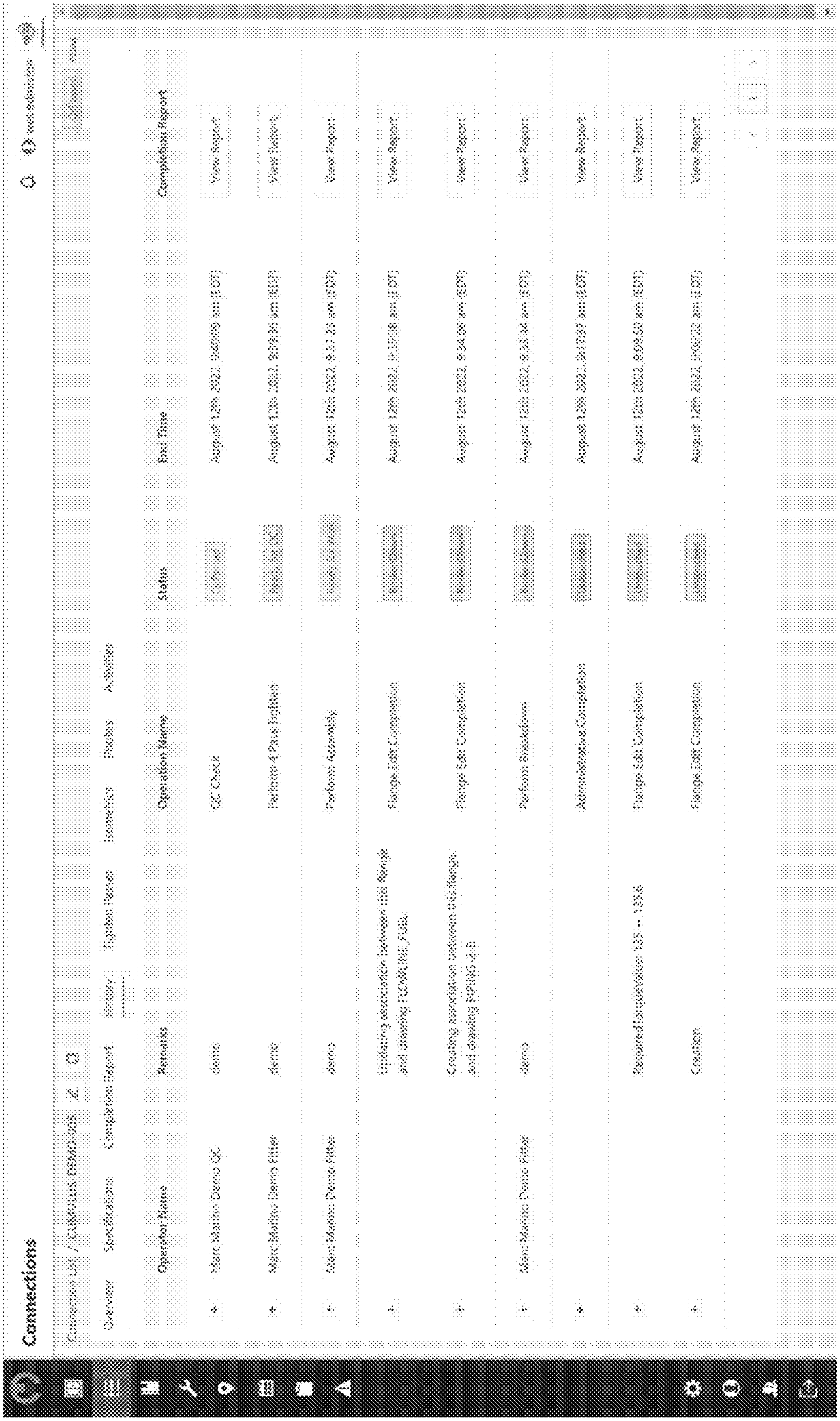
FIG. 5C illustrates a workpiece interface.

FIGS. 5A-5C illustrate top level user interfaces according to an example.

FIG. 5A illustrates a workflow builder interface 1000 according to an example. The workflows described herein, for example processes 800 and 900, may be created or generated by users, for example top level users and/or services configured to integrate with and communicate with the client software. The services may provide a top level user with the workflow builder interface 1000 to facilitate the design and creation of workflows according to the needs of the particular industrial application or the requirements of the top level user.

The top level user may design any workflow process desired, and may set hold points, quality control checks, and work as desired. The top level user may define and incorporate sub-acts into the workflow. The top level user may specify an order in which to perform acts of the workflow, and may update the workflow in realtime or responsive to receiving data collected by the guidance device. As shown, the workflow includes a breakdown act 1002, an assemble act 1004, an intermediate act 1006, and a field complete act 1008, and a quality control act 1010. Each act contains numerous subacts. Breakdown act 1002 includes four subacts, a first breakdown subact 1002*a* including a record connection tag action and a confirmation action, a second breakdown subact 1002*b* including a checklist action and a confirmation action, a cutout connection subact 1002*c* including a take photo action and a confirmation action and a blast/sand act 1002*d* including multiple actions, for instance a checklist, take photo, review photo, and confirmation act. The other acts 1004, 1006, 1008 include subacts (unlabeled) having one or more actions as well. It will be appreciated that the workflow created by the workflow builder interface 1000 may have any number of acts, each act having any number of subacts, and each subact having any number of actions associated with it.

The workflow created by the top level user may be automatically compiled and turned into workflow instructions that are provided by the guidance device to the end user.

FIG. 5B illustrates an example of a control center interface 1100 according to an example. The services may generate the control center interface 1100 and populate it with relevant data to provide to a top level user. The control center interface 1100 provides access to data analytics and other information pertaining to the industrial application. For example, as shown, the control center interface 1100 provides the top level user with a timeline of the completion level chart 1102 of the industrial application. The line on the completion level chart 1102 indicates a percentage completion of the work being performed on the industrial application. The subsystem distribution chart 1104 indicates, by category, how many workpieces in each category remain untouched compared to those that have been identified, operated on with a tool, those that have passed and/or failed a quality check, and so forth. The top bar 1106 provides at-a-glance information about the overall status of the work being performed on the industrial application. It will be appreciated that other data can also be included, for example, work completion by day, exceptions, errors, and any other information desired.

FIG. 5C illustrates a workpiece interface 1200 according to an example. The workpiece interface 1200 provides data associated with a particular workpiece to the top level user. The top level user may view, at a glance, the status of various types of acts, for example, tagging (identifying) the workpiece, and so forth. The workpiece interface 1200 allows the top level user to rapidly review data collected with respect to any workpiece, and to view summaries highlighting important data pertaining to said workpiece.

Figure 6A:
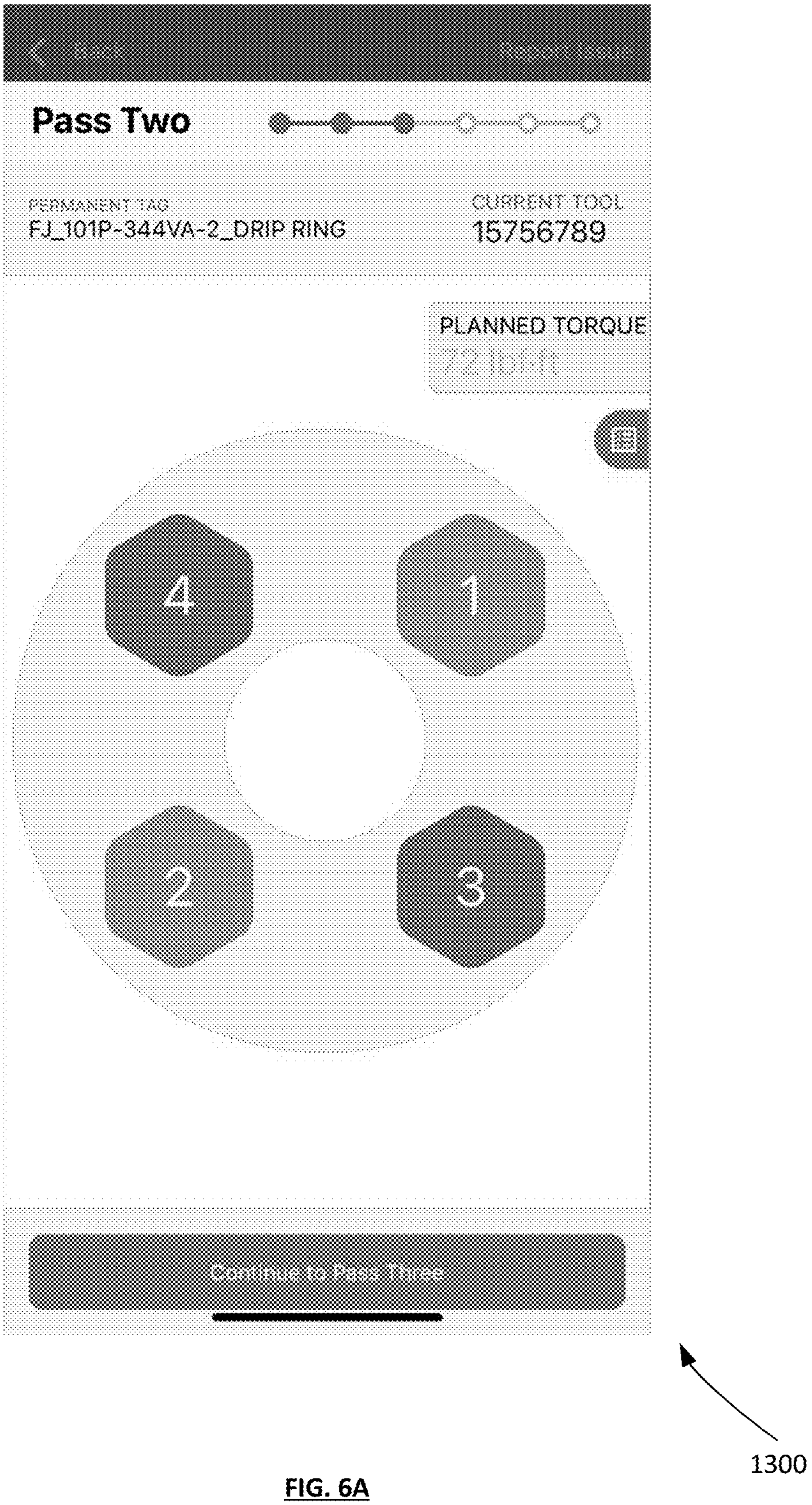
FIG. 6A illustrates a bolt tightening interface.
Figure 6B:
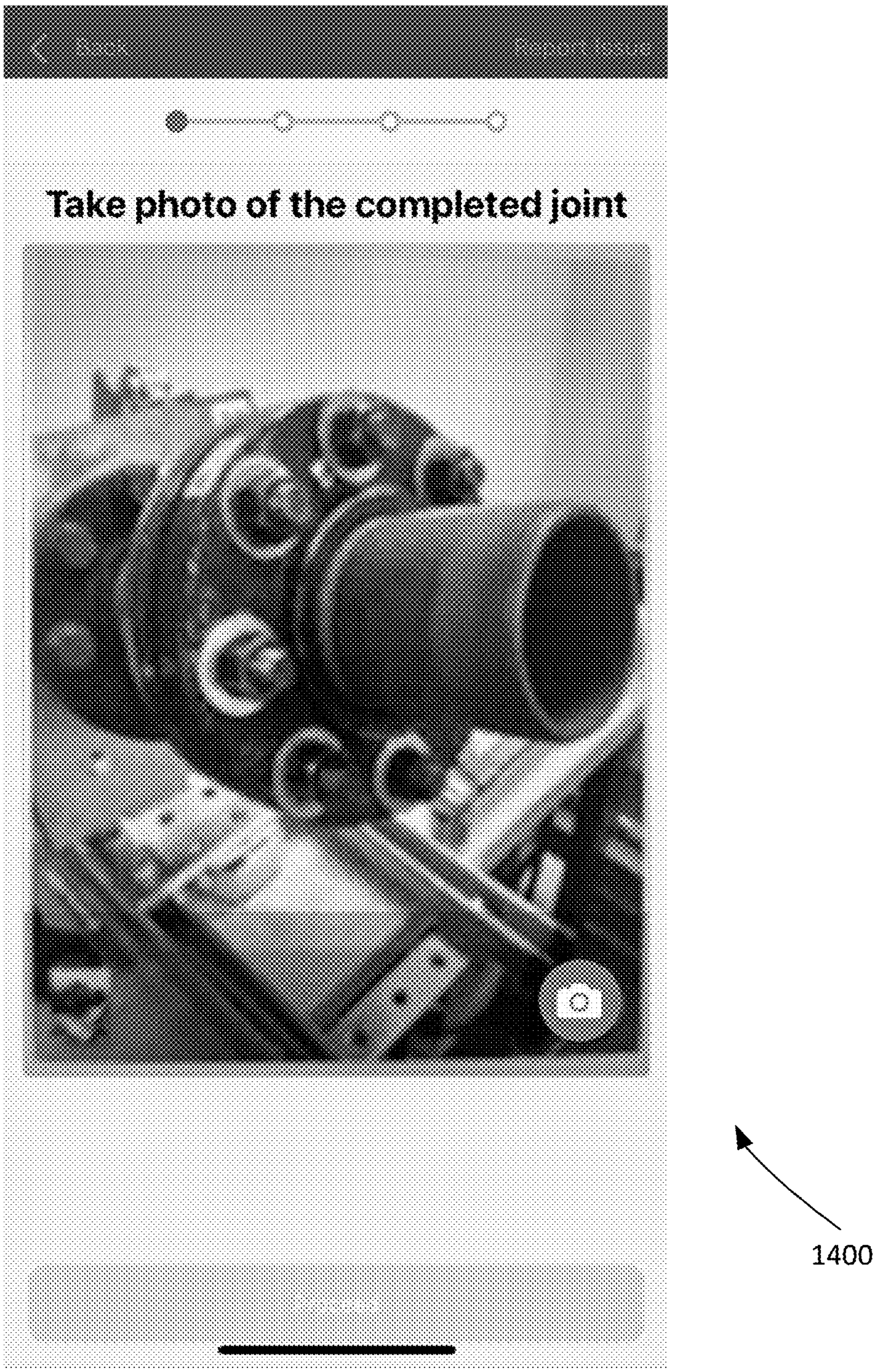
FIG. 6B illustrates a photo interface.
Figure 6C:
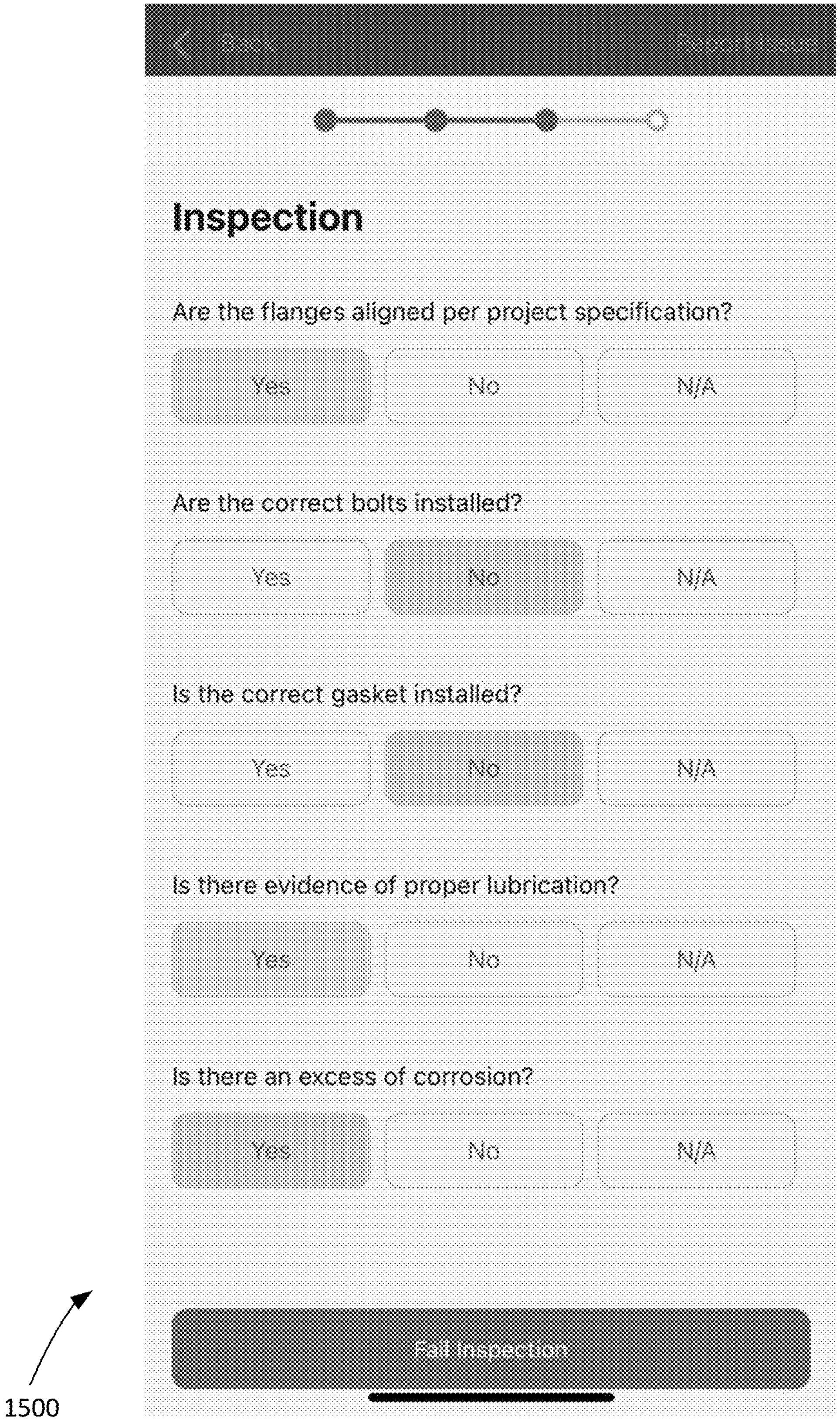
FIG. 6C illustrates a checklist interface.

FIGS. 6A-6C illustrate various guidance device interfaces according to examples.

FIG. 6A illustrates a bolt tightening interface 1300 according to an example. The interface features four hexagons labeled 1, 2, 3, and 4. Each hexagon is associated with a workpiece, for example a bolt, on an apparatus. Each hexagon may have a color assigned to it indicating the error status of the workpiece. Each hexagon may also have a number on it indicating the order in which the end user is to operate the tool on the workpiece.

FIG. 6B illustrates a photo interface 1400 according to an example. The guidance device provides an instruction to take a photo of a workpiece, for example, a flange face, and the end user takes said photo. Once the end user takes a photo of the workpiece, the guidance device displays the photo taken and gives the end user the opportunity to submit or retake the photo.

FIG. 6C illustrates a checklist interface 1500 according to an example. The checklist interface 1500 may be presented by the guidance device to the end user during a quality check, when a hold is placed on a workpiece, or whenever the workflow includes a requirement step where the end user verifies certain requirements. The checklist may be designed by a top level user to include any options. As illustrated, the checklist interface 1500 includes five yes/no questions for the end user to select answers, the answers including "Yes," "No" and "N/A" (not applicable). Once the end user answers the questions, the end user may submit the answers. When the answers are submitted, the guidance device may upload the answers to other guidance devices, the local client, and/or the services. The answers may be analyzed by the services, and data contained in the answers may be made available to a top level user via a top level user interface such as the interfaces discussed with respect to FIGS. 5A-5C.

An operational example of aspects and elements of the disclosure will now be provided. In an example, an industrial application requires work to be performed, for example the construction of a facility or repair of a facility or piece of equipment within the facility. An industrial application workflow may be required to boost efficiency, maintain records, and monitor the status of the work in real-time.

A service may be set up to manage the workflow. A top level user may design a workflow, creating instructions for each step of the workflow. A local client may also be set up to provide any functionality provided by the services if the service is unavailable, either temporarily or permanently. The top level user may, as part of implementing the workflow, create various steps or acts, and populate each act with sub-acts. Each sub-act may be populated with various actions or requirements. In this operational example, the work to be performed will include a pressure test of a valve that needs to be installed.

The top level user therefore defines a workpiece—the valve to be installed—and a data source—a pressure sensor. The top level user may also define various tools to be used, for example, a wrench to adjust the valve and tighten it into place. The top level user may also identify the location or parts of the industrial application where the valve is to be installed. In this example, the top level user defines the following acts as part of the workflow instructions: (1) identify the workpiece and collect the necessary tools and sensors, (2) identify the part of the industrial application and take photos of the part prior to operating the tool, (3) perform a quality check of the workpiece (the valve) and the tools, to ensure they are in condition to be used, (4) pair the pressure sensor with the guidance device, (5) operate the tool on the workpiece and take pressure readings of the valve, (6) take photos of the workpiece and parts of the industrial application after completing operation of the tool and upload the data from the pressure sensor, (7) perform data analytics on the data and issue a hold if necessary, (8) if a hold is issued, prompt the top level user to prepare remediation instructions.

The top level user submits the workflow instructions to services, which relays the workflow instructions to a guidance device. At the work-site (i.e., at the industrial application) an end user (a worker) receives a guidance device, for example from a supervisor, and the guidance device displays the workflow instructions. More particularly, the guidance device displays the workflow instructions corresponding to an identify workpiece act, such as act 202 of FIG. 2A, which instruct the end user identify the workpiece and collect the necessary tools and sensors. Responsive to receiving these instructions, the end user finds the workpiece (the valve) and the necessary tools and sensors (wrench and pressure sensor). The guidance device may automatically pair with the pressure sensor, or the end user may manually pair the guidance device and pressure sensor. For each action taken, the end user indicates by inputting to the guidance device that they have retrieved the workpiece, sensor, and tool, and paired the sensor to the guidance device. The guidance device confirms that each action is complete, and then displays the next set of workflow instructions.

The next workflow instructions instruct the end user to collect application and workpiece state data, for example, corresponding to act 204 of FIG. 2A. For example, the instructions instruct the end user to identify the part of the industrial application the valve will be installed, and take photos of said part. Responsive to receiving these instructions, the end user proceeds to the designated part of the industrial application—in this example, a pipe requiring a valve—and takes photos of the pipe. The end user may also optionally identify the pipe by any markings on the pipe or on the surroundings, or by the pipe's geographic location (for example, via a set of coordinates). The end user inputs to the guidance device the photos and other state information. The guidance device then provides the end user with workflow instructions instructing the end user to verify the condition of the valve, wrench, and sensor. The end user may manually inspect the parts for errors, take photos of each part, and so forth. The collected data is submitted to the guidance device, and the guidance device proceeds to the next set of workflow instructions.

The workflow instructions now instruct the end user to operate the tool and collect tool operation data, for example, corresponding to acts 206-210 of FIG. 2A. The guidance device instructs the end user to pair the sensor with the guidance device (if not already paired). Once the sensor is ready, the guidance device instructs the end user to operate the tool, and may provide detailed instructions. For example, the guidance device may instruct the end user to tighten the valve using the wrench by turning the wrench a set number of rotations in a particular direction, and then testing the pressure in valve using the pressure sensor. If the pressure is inadequate, the guidance device may instruct the end user to continue tightening the valve by turning the wrench an additional number of rotations and then checking the pressure sensor again. Once the pressure sensor returns an acceptable value, the data related to the tool operation (for example, number and direction of rotations) and pressure level are uploaded via the guidance device to the local client and/or services.

The guidance device then provides the next set of workflow instructions, for example corresponding to act 212 of FIG. 2A. The workflow instructions may instruct the end user to take additional photos of the valve and the pipe (i.e., the workpiece and the industrial application) following operation of the tool. The end user verifies completion of these actions and the data is recorded by the guidance device and/or uploaded to the local client/services. Once the end user has collected all desired data, the end user receives instructions that the work is complete with respect to the workpiece. The data is then reviewed.

For example, the guidance device uploads all collected data to the services, which may correspond to act 216 of FIG. 2A. The services analyze the data and construct a data model of the workpiece and the industrial application. Any potential errors are flagged. For example, it may be expected that the valve should take only ten turns to tighten, but the end user required twenty turns. The excess turns may suggest that there is a problem with the valve or with the pipe. Accordingly, the services may automatically flag the valve for review, or may submit the errors to the top level user, who may then determine whether to flag the valve for review.

If an error is detected, for example corresponding to act 218 (YES) of FIG. 2A, remediation may be required, for example corresponding to act 220 of FIG. 2A. If remediation is required, the top level user may create additional remediation instructions in a manner substantially similar to the creation of the workflow instructions, and then provide, via the services, the remediation instructions to a guidance device. An end user may receive the guidance device and act on the remediation instructions.

If no errors are detected, for example corresponding to act 218 (NO) of FIG. 2A, the data may be validated, for example corresponding to act 222 of FIG. 2A. When the data is validated, all the data is aggregated and recorded and taken as canonical (that is, as true). The data may then be accessed by top level users and others for review, audits, or any other purpose.

It will be appreciated that the term tool does not necessarily mean a single tool of a single type. The term tool may mean one or more tools of one or more different types. For example, the tool may be a screwdriver, or it may be two or more tools such as a screwdriver and a wrench. It will be appreciated by those skilled in the art that some workpieces require multiple tools of multiple types to properly operate upon the workpiece for a desired effect or purpose.

It will also be appreciated that any act described with respect to any process or workflow herein may be performed in any order, and not necessarily only in the order described.

Various devices may be used to execute the various operations described above. The tools described, including smart-tools, may be any type of tool (wrench, hammer, drill, screwdriver, drain snake, and so forth), and should not be considered as limited to any particular class or group of tools. The guidance device may be any type of computational device configurable to communicate with a sensor (cell phones, personal digital assistants, tablet computers, laptops, ASICs, FPGAs, any device with a processor or microprocessor, and so forth). The sensor may be any type of sensor, analog or digital, and may communicate with the guidance device directly or indirectly. Examples of direct communication include communication protocols designed to transfer data from the sensor to the guidance device without an intermediary (Bluetooth, Wi-Fi, optical communication protocols, and so forth), and examples of indirect communication include manual entry, relaying data through an intermediary system, such as a server or USB thumb drive, and so forth Local clients and services may be any type of discrete or distributed computer system (cell phones, PDAs, tablets, laptops, desktop computers, ASICs, FPGAs, any device with a process or microprocessor, servers, cloud-based servers or server infrastructure, and so forth). As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A method of managing workflow for an industrial application, comprising:
- providing a guidance device configured to be communicatively coupled to a tool configured to be used on a workpiece;
- obtaining, via the guidance device, identification data pertaining to the workpiece being used in the industrial application;
- obtaining, via the guidance device, industrial application state data pertaining to at least one state of the industrial application;
- obtaining, via the guidance device, workpiece state data;
- operating the tool on the workpiece;
- obtaining, via the guidance device, tool operation data;
- monitoring, in real-time based on the tool operation data, operation of the tool to detect a threshold tool operation corresponding to a point where tool operation should be discontinued, the tool operation data being a real-time measure of the physical operation of the tool on the workpiece;
- responsive to detecting the threshold tool operation, providing an output to a user instructing the user to discontinue operation of the tool;
- uploading to a computer service, via the guidance device, at least one of the identification data, the industrial application state data, and the tool operation data; and
- validating the industrial application state data.

2. The method of claim 1 wherein obtaining industrial application state data pertaining to at least one state of the industrial application includes:
- obtaining a first industrial application state data pertaining to the state of the industrial application prior to operation of the tool;
- obtaining a second industrial application state data pertaining to the state of the industrial application after operation of the tool; and
- uploading at least one of the first and the second industrial application state data to the computer service.

3. The method of claim 2 wherein the second industrial application state data is based at least in part on the tool operation data.

4. The method of claim 1 further comprising:
- obtaining a first workpiece state data corresponding to the state of the workpiece prior to operation of the tool;
- obtaining a second workpiece state data corresponding to the state of the workpiece after operation of the tool; and
- uploading at least one of the first and the second workpiece state data to the computer service.

5. The method of claim 4 wherein the second workpiece state data is based at least in part on the tool operation data.

6. The method of claim 1 wherein the industrial application state data is obtained by a set of requirements verified by an end user.

7. The method of claim 1 wherein the tool operation data is obtained from a sensor configured to monitor the operation of the tool on the workpiece.

8. The method of claim 1 wherein validating the industrial application state data includes:
- flagging the workpiece for review responsive to determining that an error in the operation of the tool may have occurred;
- responsive to flagging the workpiece for review, contingently flagging one or more additional workpieces, wherein contingently flagging one or more additional workpieces means that no work will be performed on the one or more additional workpieces until after the workpiece is reviewed;
- performing a quality check on the workpiece; and
- releasing the workpiece and the one or more additional workpieces from review.

9. The method of claim 1 wherein the computer service analyzes the data it receives and provides analytic information to a user, the analytic information including a data model for the workpiece based on at least the industrial application state data.

10. The method of claim 9 further comprising analyzing the at least one of the identification data, the industrial application state data, and the tool operation data for errors;
- determining, based on the data analysis, if a remediation process is required, wherein the remediation process includes placing a hold on the workpiece and taking remedial action until remediation is no longer required, in which case the workpiece is released.

11. The method of claim 1 wherein uploading to the computer service via the guidance device further comprises:
- transmitting the industrial application state data from a guidance client installed on the guidance device to a local client communicatively coupled to the guidance client;
- transmitting the industrial application state data from the local client to a server communicatively coupled to the local client, the server hosting a database configured to store the industrial application state data; and
- transmitting the industrial application state data from the server to the computer service, the computer service being configured to perform operations on the industrial application state data.

12. The method of claim 11 wherein the operations the computer service is configured to perform on the industrial application state data include:

data analytics; and building a data model of the industrial application associated with the industrial application state data.

13. The method of claim 1 wherein the guidance device is further configured to provide workflow instructions to the end user, the instructions instructing the end user on at least one of:

which workpiece to operate the tool on;

when to collect the industrial application state data; and when to collect the tool operation data.

14. The method of claim 13 wherein providing workflow instructions to the end user causes the guidance device to update information displayed to the end user.

15. A non-transitory computer readable medium containing thereon sequences of computer executable instructions for managing workflow of an industrial application, the sequences of computer readable instructions including instructions that instruct at least one processor to:

provide workflow instructions to a first user;

associate identification data with a workpiece, the workpiece being used in the industrial application;

associate industrial application state data with one of a first industrial application state and a second industrial application state, the first industrial application state corresponding to a state of the industrial application before operation of a tool on the workpiece, and the second industrial application state corresponding to a state of the industrial application after operation of the tool on the workpiece;

monitor, in real-time via the tool operation data, operation of the tool to detect a threshold tool operation corresponding to a point where tool operation should be discontinued, the tool operation data being a real-time measure of the physical operation of the tool on the workpiece;

responsive to detecting the threshold tool operation, provide an output to a user instructing the user to discontinue operation of the tool;

associate workpiece state data pertaining to the workpiece with the identification data;

update at least the second industrial application state data based on tool operation data associated with the operation of a tool on the workpiece; and upload at least one of the identification data, the first industrial application state data, the second industrial application state data, and the workpiece state data to a computer service.

16. The non-transitory computer readable medium of claim 15, wherein the workflow instructions further include one or more of:

selecting an appropriate tool to use on the workpiece;

recording the identification data associated with the workpiece;

recording the industrial application state data;

recording the workpiece state data; and stopping work on the workpiece pending release of a hold associated with the workpiece.

17. The non-transitory computer readable medium of claim 16 wherein instructions further instruct the processor to record completion of a given workflow instruction responsive to the first user indicating completion of the given workflow instruction.

18. The non-transitory computer readable medium of claim 15, the instruction further instructing the at least one processor to instruct the computer service to:

provide the data to a second user;

perform data analytics on the data, the data analytics including building a data model of the workpiece;

place a hold on the workpiece responsive to receiving an instruction to place the hold on the workpiece; and release the hold on the workpiece responsive to receiving an instruction to release the hold on the workpiece.

19. The non-transitory computer readable medium of claim 18, wherein the data includes at least one of the industrial application state data, the workpiece state data, and the tool operation data.

20. The non-transitory computer readable medium of claim 18, wherein the second user provides the instructions to place the hold on the workpiece and to release the hold on the workpiece.

21. The non-transitory computer readable medium of claim 18, the instructions further instructing the at least one processor to instruct the computer service to provide the data analytics to the second user.

22. The non-transitory computer readable medium of claim 18, the instructions further instructing the at least one processor to change the workflow instructions responsive to inputs from the second user.

23. A system for managing workflow of an industrial application, the system comprising:

at least one sensor;

a guidance device configured to:

provide instructions to a user, the instructions indicating acts of the user to perform;

receive from the at least one sensor at least one of tool operation data obtained responsive to the operation of a tool, industrial application state data, and workpiece state data;

monitor, in real-time via the tool operation data, operation of the tool to detect a threshold tool operation corresponding to a point where tool operation should be discontinued, the tool operation data being a real-time measure of the physical operation of the tool on the workpiece;

responsive to detecting the threshold tool operation, provide an output to a user instructing the user to discontinue operation of the tool; and provide at least one of the tool operation data, the industrial application state data, and the workpiece state data to a computer service, the computer service configured to:

receive at least one of the tool operation data, the industrial application state data, and the workpiece state data;

perform data analytics on received data, including generating a data model associated with the workpiece;

place a hold on the workpiece;

release the hold from the workpiece; and audit the received data.

24. The system of claim 23, wherein the tool operation data is associated with the operation of the tool and is received by the guidance device from the at least one sensor in communication with the guidance device, the at least one sensor being configured to monitor the operation of the tool to produce the tool operation data.

25. The system of claim 23 further comprising a local client configured to communicate with the guidance device and the computer service, the guidance device providing the at least one of the tool operation data, the industrial application state data, and the workpiece state data to the local client, and the local client providing the at least one of the tool operation data, the industrial application state data, and the workpiece state data to the computer service.

26. The system of claim 25, wherein the local client is further configured to provide updated data to the guidance device in response to receiving at least one of the industrial application state data, the workpiece state data, the tool operation data, data indicative of the hold being placed on the workpiece, and data indicative of the hold being released from the workpiece.

27. The system of claim 23 wherein the industrial application state data includes a first industrial application state data and a second industrial application state data, the first industrial application state data corresponding to a state of the industrial application prior to operation of the tool on the workpiece, and the second industrial application state data corresponding to a state of the industrial application after operation of the tool on the workpiece.

* * * * *